United States Patent [19]
Lesesky et al.

[11] Patent Number: 5,677,667
[45] Date of Patent: Oct. 14, 1997

[54] DATA COMMUNICATIONS APPARATUS FOR TRACTOR/TRAILER USING PNEUMATIC COUPLER

[75] Inventors: Alan C. Lesesky, Charlotte, N.C.; Bobby Ray Weant, Rock Hill; David James Lee, Clover, both of S.C.

[73] Assignee: Vehicle Enhancement Systems, Inc., Rock Hill, S.C.

[21] Appl. No.: 393,566

[22] Filed: Feb. 23, 1995

[51] Int. Cl.⁶ .................................................. G08B 21/00
[52] U.S. Cl. .......................... 340/431; 340/452; 340/531; 455/90; 439/35
[58] Field of Search .................... 340/431, 451, 340/452, 531, 825.06, 825.54, 854.3, 855.1; 455/95, 99, 89, 90; 439/35

[56] References Cited

U.S. PATENT DOCUMENTS

| | | | |
|---|---|---|---|
| 2,379,664 | 7/1945 | Stanko | D12/423 |
| 2,483,815 | 10/1949 | Easton | 336/90 |
| 3,154,360 | 10/1964 | Plishner | 439/335 |
| 3,184,703 | 5/1965 | Piscitello et al. | 439/335 |
| 3,387,606 | 6/1968 | Crafts et al. | 128/202.27 |
| 3,428,334 | 2/1969 | Hils | 280/421 |
| 4,041,470 | 8/1977 | Slane et al. | 364/424.04 |
| 4,183,599 | 1/1980 | Wetzig | 439/35 |
| 4,624,472 | 11/1986 | Stuart et al. | 280/420 |
| 4,715,012 | 12/1987 | Mueller, Jr. | 364/424.07 |
| 4,733,919 | 3/1988 | Jacobs et al. | 303/28 |
| 4,735,461 | 4/1988 | Moller et al. | 303/7 |
| 4,752,899 | 6/1988 | Newman et al. | 364/550 |
| 4,767,181 | 8/1988 | McEowen | 385/78 |
| 4,772,209 | 9/1988 | Muncey | 439/36 |
| 4,838,797 | 6/1989 | Dodier | 439/38 |
| 4,839,531 | 6/1989 | Stemmons et al. | 307/17 |
| 4,897,642 | 1/1990 | DiLullo et al. | 340/825.06 |
| 4,969,839 | 11/1990 | Nilsson | 439/395 |
| 5,025,253 | 6/1991 | DiLullo et al. | 340/825.06 |
| 5,142,278 | 8/1992 | Moallemi et al. | 340/825.06 |
| 5,385,476 | 1/1995 | Jasper | 439/38 |
| 5,442,810 | 8/1995 | Jenquin | 455/66 |
| 5,488,352 | 1/1996 | Jasper | 340/431 |

FOREIGN PATENT DOCUMENTS

| | | |
|---|---|---|
| 52-33092 | 3/1977 | Japan . |
| WO 94/12962 | 6/1994 | WIPO . |

*Primary Examiner*—Jeffery Hofsass
*Assistant Examiner*—Daniel J. Wu
*Attorney, Agent, or Firm*—Bell, Seltzer, Park & Gibson

[57] ABSTRACT

In combination with a tractor and a trailer, an apparatus and method are provided for monitoring various operating conditions of at least the trailer by a driver positioned on the tractor. The apparatus preferably has a pneumatic braking system carried by the tractor and the trailer to permit the driver to supply pneumatic braking pressure from the tractor to the trailer. The pneumatic braking system preferably includes at least one pair of air hoses connected to the tractor and the trailer and a coupler connected to the pair of air hoses. The coupler has interconnecting first and second coupler portions arranged to facilitate connecting and disconnecting the pair of air hoses. The apparatus also has a data communications system which preferably includes a respective pair of transceivers connected to the first and second coupler portions for communicating signals representative of monitoring data from the trailer to the tractor so as to in turn be monitored by a driver positioned on the tractor.

42 Claims, 20 Drawing Sheets

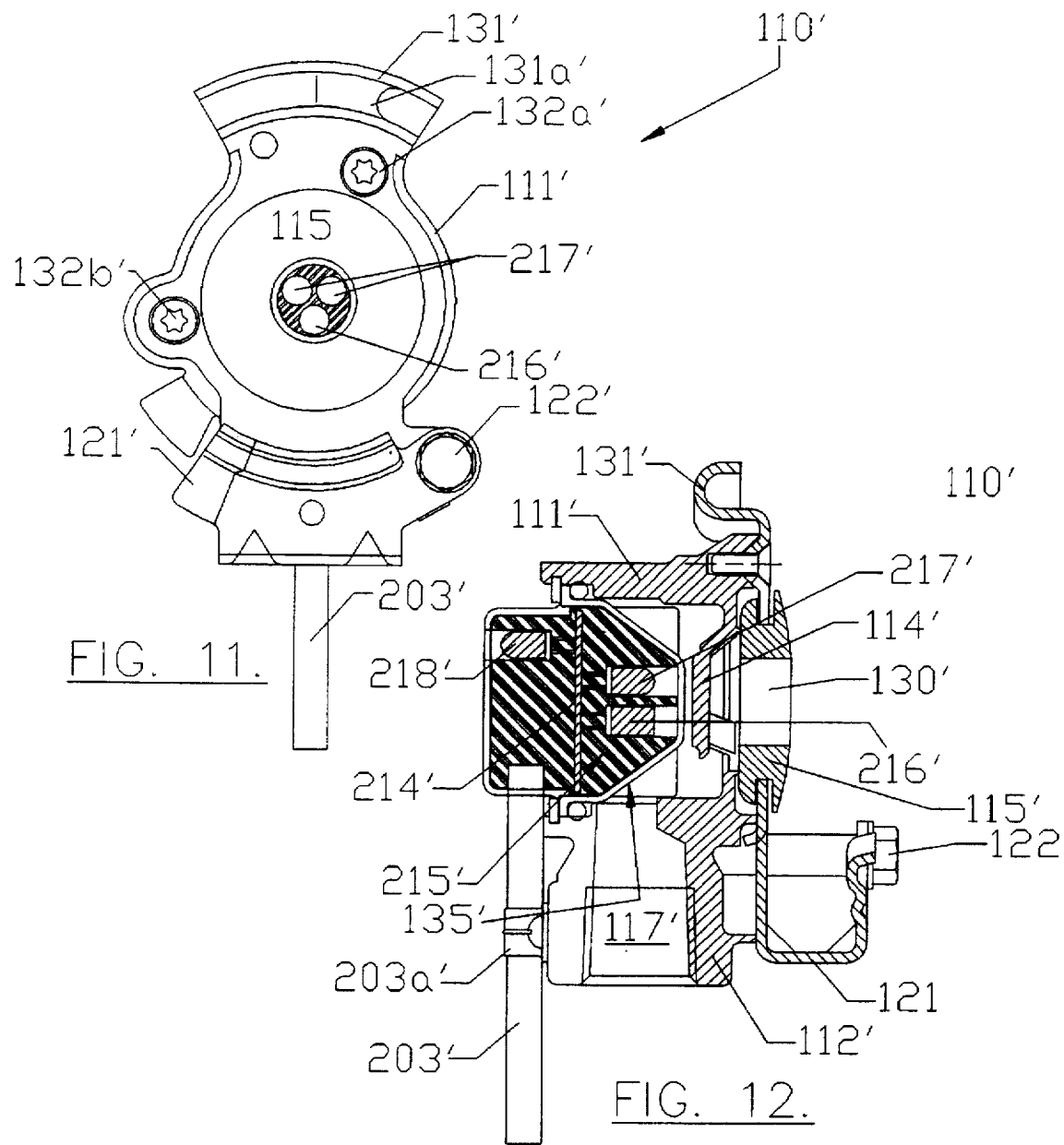

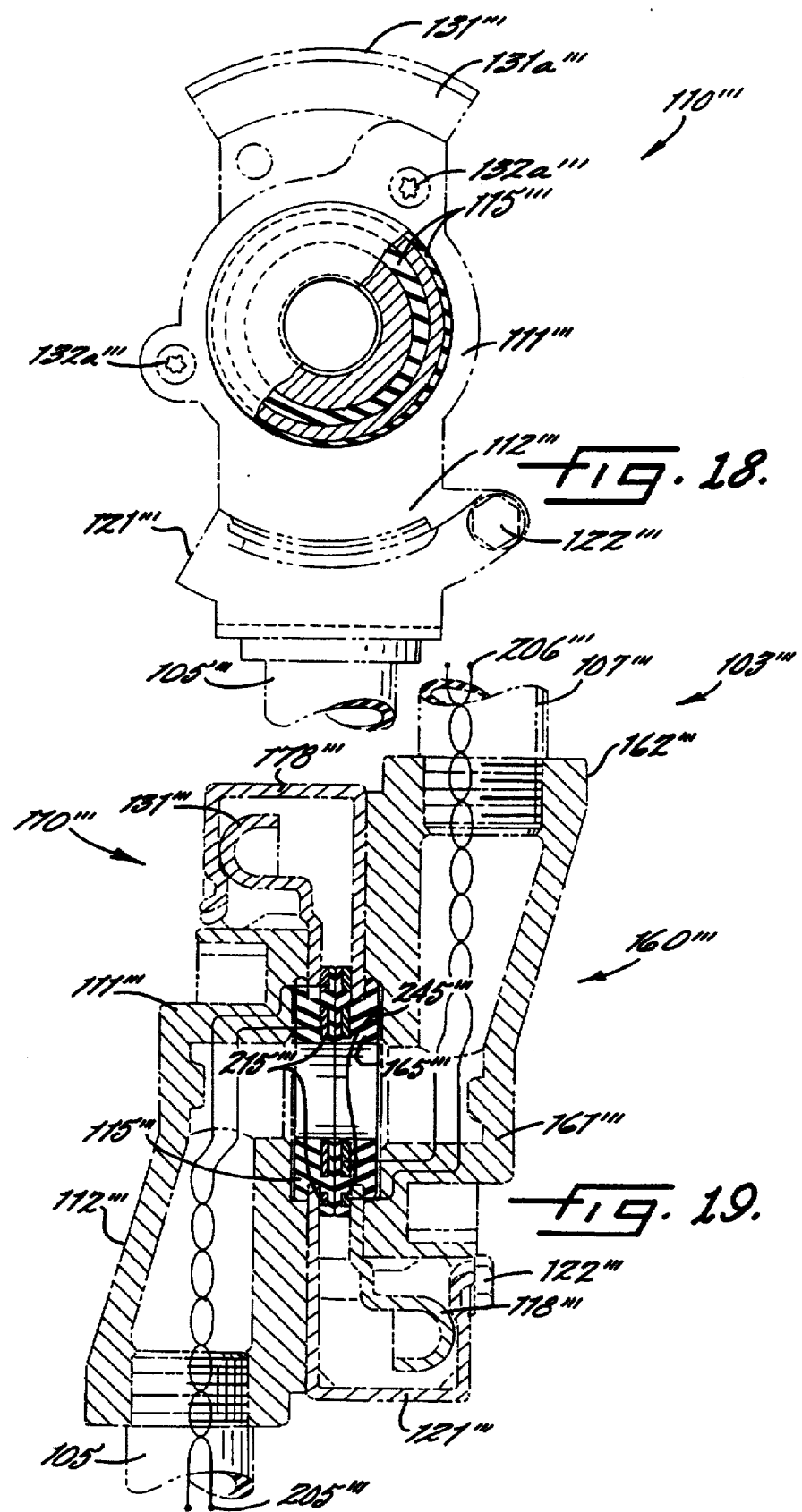

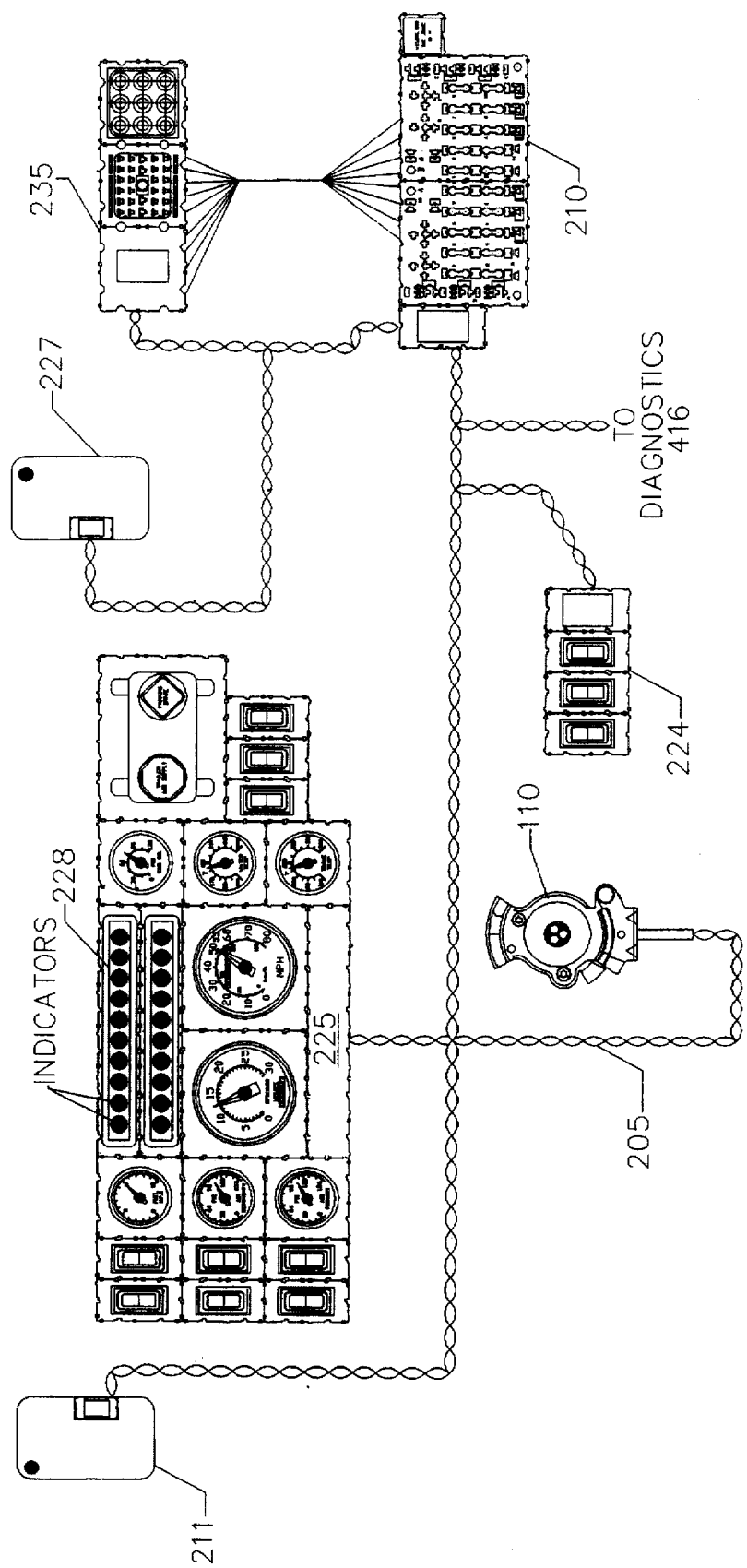

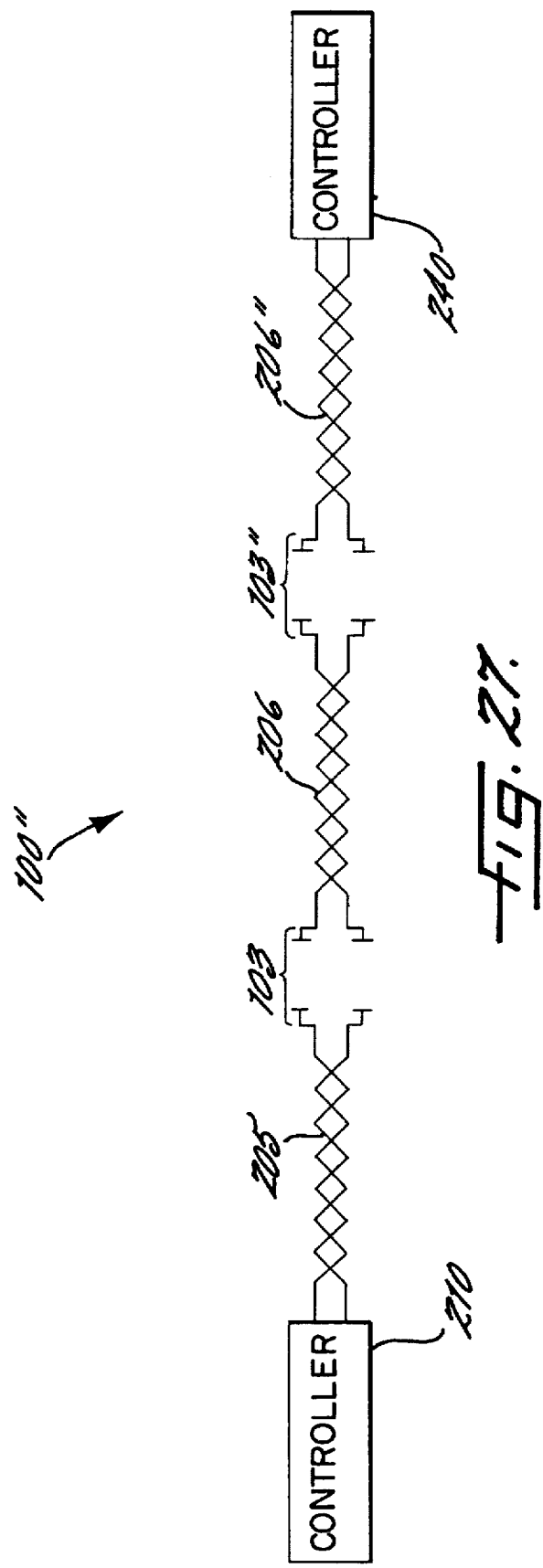

ns a data communications apparatus and an associated method for use in a tractor/trailer combination which uses a pneumatic coupler to provide a data communication link between the tractor and the trailer.

5,677,667

DATA COMMUNICATIONS APPARATUS FOR TRACTOR/TRAILER USING PNEUMATIC COUPLER

FIELD OF THE INVENTION

This invention relates generally to a data communications apparatus and, more specifically, to an associated method for data communication between a tractor and a trailer using a pneumatic coupler.

BACKGROUND OF THE INVENTION

The trucking industry has for many years used tractor/trailer combinations to transport cargo over the roadways to intended destinations. Conventionally, the tractors and the trailers are mechanically coupled together so that the tractor can pull the trailer with its cargo in an efficient and cost effective manner.

Various links between the tractor and the trailer provide vehicle subsystems with power or other signals to operate, i.e., lights, brakes. Thus, hydraulic, pneumatic, electrical, and other subsystems on the tractor/trailer combination have associated electrical conductors and pneumatic lines running therebetween so these subsystems can operate.

An example of such a subsystem includes the pneumatic braking system and associated pneumatic connections extending between the tractor and the trailer. These pneumatic connections typically include: hoses and pneumatic couplers, i.e., "gladhand" couplers, positioned between the tractor and the trailer. Conventionally, one pneumatic brake line connection is the emergency line providing constant pneumatic pressure to the trailer. The other pneumatic brake line connection provides a control signal to the trailer for service of the brakes, e.g., during vehicle operation. The gladhand pneumatic couplers are well known in the industry and have been specified by the Society of Automotive Engineering ("SAE") according to the standard number J318 (hereinafter referred to as "SAE J318").

The electrical subsystems of both the tractor and trailer operate in a manner which requires coordination between the electrical components on each to operate the tractor/trailer combination safely and effectively. Conventionally, in order to coordinate such operation and to supply power from the tractor to the trailer, a seven-pin connector has been used by the trucking industry to accomplish these and other electrical objectives. The connector includes two disengageable connector portions to permit the tractor and trailer combination to be disconnected. An example of such a seven-pin connector is illustrated in U.S. Pat. No. 4,969,839 by Nilsson titled "Electrical Connector." These seven-pin connectors also are well known and have been specified by the Society of Automotive Engineering "SAE" according to the standard number J560 (hereinafter referred to as "SAE J560"). Thus, one need only ask for an SAE J560 connector from an appropriate manufacturer, and the standard seven-pin connector will be delivered.

Each of the pins in the standard seven-pin connector is an electrical conductor carried by the plug portion of the connector which is adapted to mate with a corresponding electrical contact in the receptacle portion of the connector to thereby bus an electrical signal between the tractor and the trailer. The signals generally relate to specific dedicated electrical subsystems, for example, ground, turn signals, brake lights, clearance lamps, flashers, and other devices which require electrical power to function.

The trucking industry has not, until very recently, incorporated sophisticated electrical and electronic subsystems in tractor/trailer combinations which perform varied tasks that usually involve data manipulation and transmission. Computers, controllers, and computer-type electrical systems have simply not found their way into the tractor/trailer combination in any significant fashion up to now due, in part, to the low level of technological innovation in the trucking industry, due to a lack of governmental or other authoritative impetus which would otherwise require systems to be installed on tractor/trailer combinations that include sophisticated electronics and data communications, and due to the high number of existing conventional tractors and trailers currently in use by a variety of industries for transportation of cars and the like.

With the advent of anti-lock braking subsystems ("ABS") for example, and other new subsystems which promote tractor/trailer safety and enhanced performance, however, microprocessors have found their way into use in the trucking industry, and specifically in applications involving tractor/trailer combinations to enhance the performance of these new subsystems. It is apparent that the use of computers and microprocessors in general in the trucking industry will continue to expand and provide ever increasing capabilities to tractor/trailer combinations in a wide range of applications.

Along with the sophistication of computer and electronic subsystems comes the requirement of equally sophisticated and versatile data communications systems such as between microprocessors and devices which use data output from the computers, or which input data to the computers. Thus, it is desirable to develop and implement data communication links and circuits to provide the microprocessors and systems in tractor/trailer combinations with reliable data communication. This is particularly true when data must reliably be communicated between data producing devices and data receiving devices that may be found both on the tractor and the trailer, and when data must be transmitted between the tractor and the trailer. An example of this type of data communication between the tractor and the trailer is found in an ABS subsystem where data about the performance of the brakes on the trailer is desirably communicated to a computer in the tractor which will, in turn, further actuate control valves on the trailer to control the ABS's performance.

The standard seven-pin connector, ubiquitous in the trucking industry, however, is simply not suited to provide sophisticated data communications and power between the tractor and the trailer. The seven-pin connector, and other similar connectors such as seen in U.S. Pat. No. 4,624,472 to Stuart et al. titled "Coupling Mechanism For Coupling Fluid And Electrical Lines Between Adjacent Vehicles," has only been used in the past to provide analog electrical signals, particularly power, to low-level, unsophisticated electrical subsystems in the tractor/trailer combination. The seven-pin connector and other similar connectors may also be readily disengaged either intentionally or accidentally which may cause various data communication and power problems in the system during operation of the tractor and trailer. Yet, the SAE J560 seven-pin connector continues to be an industry standard and is used in virtually every tractor/trailer in service today. Otherwise, the seven-pin connector will likely remain in service for many years and to some extent limit the upgrading of existing and future tractor and trailer combinations to move effective and sophisticated data communications systems.

SUMMARY OF THE INVENTION

In view of the foregoing background, it is therefore an object of the present invention to provide, in combination with a tractor and a trailer, an apparatus for monitoring various operating conditions of at least the trailer by a driver positioned on the tractor.

It is another object of the invention to provide a data communications apparatus and associated methods for a tractor/trailer combination that is rugged and reliable and is also compatible with a standard SAE J318 pneumatic coupler widely used in the trucking industry.

These and other objects, features, and advantages of the present invention are provided in a combination with a tractor and a trailer by an apparatus for monitoring various operating conditions of at least the trailer by a driver positioned on the tractor such as in the cab thereof. The tractor and trailer combination preferably has a pneumatic braking system to permit a driver to supply braking pressure from the tractor to the trailer. The pneumatic braking system preferably includes a plurality of pneumatic connections extending between the tractor and the trailer. The pneumatic braking system carried by the tractor and the trailer conventionally provides two physical connection(s) between the tractor/trailer: (1) a service (control) pneumatic brake line; and (2) a supply (constant air) pneumatic brake line. These pneumatic brake lines of the system preferably each include at least one pair of air hoses respectively connected to the tractor and the trailer and a coupler connected to the pair of air hoses. The coupler has first and second coupler portions arranged to facilitate connecting and disconnecting the pair of air hoses. The apparatus also has a data communications system which preferably includes at least one pair of transceivers respectively connected to the first and second coupler portions and arranged for transmitting and receiving signals representative of monitoring data from the trailer to the tractor so as to in turn be monitored by a driver positioned on the tractor.

According to the invention, the pneumatic coupler(s), i.e., SAE J318 gladhand, preferably carries transceivers, such as infrared, inductive couplers, radio frequency (read and write) circuitry, ultrasonic (read and write) circuitry, microwave circuitry, infrared, and/or a combination of inductive coupling and radio coupling or other communication techniques, in either the service or emergency pneumatic coupler(s), or both, for providing a data communications channel between the tractor and the trailer. Further, the pneumatic couplers may be enhanced for electronic ground, clean power, video, or audio signals. The backward and forward compatibility of the SAE J318 gladhand, however, would be preserved. Also, it should be noted that the vehicle tractor/trailer combination will not move or suddenly stop if the emergency (supply) pneumatic gladhand coupler becomes uncoupled. Thus, communications between the tractor/trailer stops only when the vehicle stops. Therefore, various systems associated with the tractor and/or the trailer such as brake-by-wire to the trailer would be greatly enhanced with safety using the emergency (supply) coupler as the embodiment for housing the transceiver circuitry or other communication circuitry required for transmitting and receiving data communications between the tractor and the trailer.

A display preferably is positioned on the tractor and is driven by a tractor controller for displaying information related to at least the trailer, and preferably the tractor and the trailer. The display may be in the form of indicator lights, gauges, liquid crystal display, a CRT screen, and the like, as would be readily understood by those skilled in the art. Thus, the driver can monitor the various operating conditions of the various vehicle subsystems. For example, these monitored conditions of a trailer may include trailer temperature, trailer location transponder, trailer smoke detector status, trailer identification number, trailer tire pressure, trailer brake temperature, trailer axle temperature, or trailer light status.

The data communications system described herein promotes the use of more complex computer driven circuitry in tractor/trailer combinations, thereby allowing new tractor/trailer combinations to be more sophisticated and versatile. Moreover, because the communications system is compatible with the existing SAE J318 air brake line gladhand couplers, retrofitting and equipping of existing tractors and trailers for more sophisticated and versatile data communications is also possible according to the present invention. One advantage of such a retrofit is that it may be carried out gradually throughout a fleet without incurring any incompatibility between fitted and unfitted tractors and trailers and, thereby, reduce costs for upgrading to sophisticated data communications systems of the present invention.

BRIEF DESCRIPTION OF THE DRAWINGS

Other objects and advantages will appear as the description proceeds when taken in connection with the accompanying drawings, in which:

FIG. 11 illustrates a front isometric view of a second pneumatic coupler portion according to the second embodiment of the present invention;

FIG. 12 illustrates a vertical sectional view of a second pneumatic coupler portion according to a second embodiment of the present invention;

FIG. 18 illustrates a front isometric view of a first pneumatic coupler portion having portions thereof broken away according to a fifth embodiment of the present invention;

FIG. 19 illustrates a vertical sectional view of a pneumatic coupler according to a fifth embodiment of the present invention;

FIG. 20 illustrates a schematic diagram of a controller and other modules of a data communications system of the present invention connected to various subsystems of a tractor;

FIG. 27 illustrates a schematic view of a data communications system of a tractor/multi-trailer combination according to the present invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the illustrated embodiments set forth herein; rather, these illustrated embodiments are provided so that this disclosure will be thorough and complete and will fully convey the scope of the invention to those skilled in the art. Like numbers refer to like elements throughout.

Figure 1:
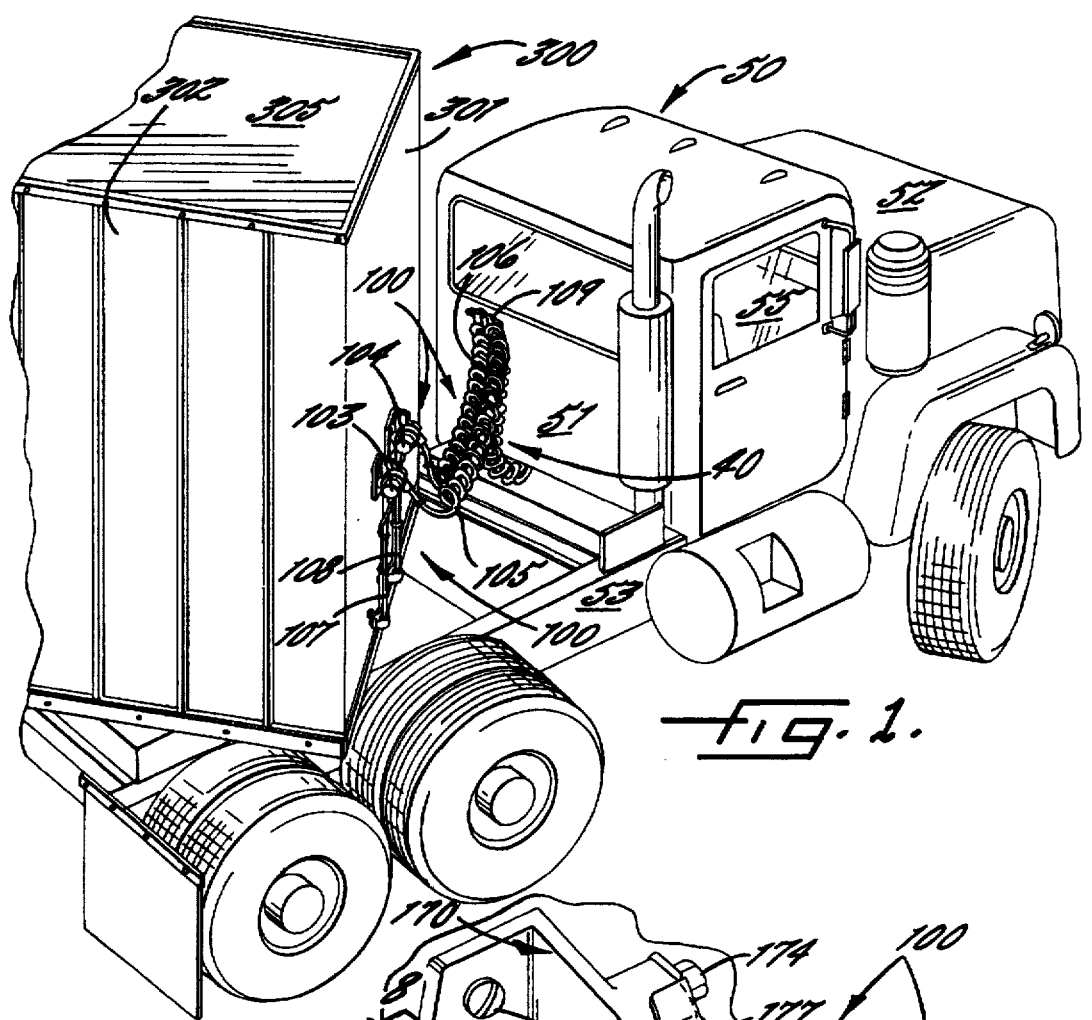
FIG. 1 illustrates a perspective view of a tractor/trailer combination including a data communications system using pneumatic couplers according to the present invention.
Figure 2:
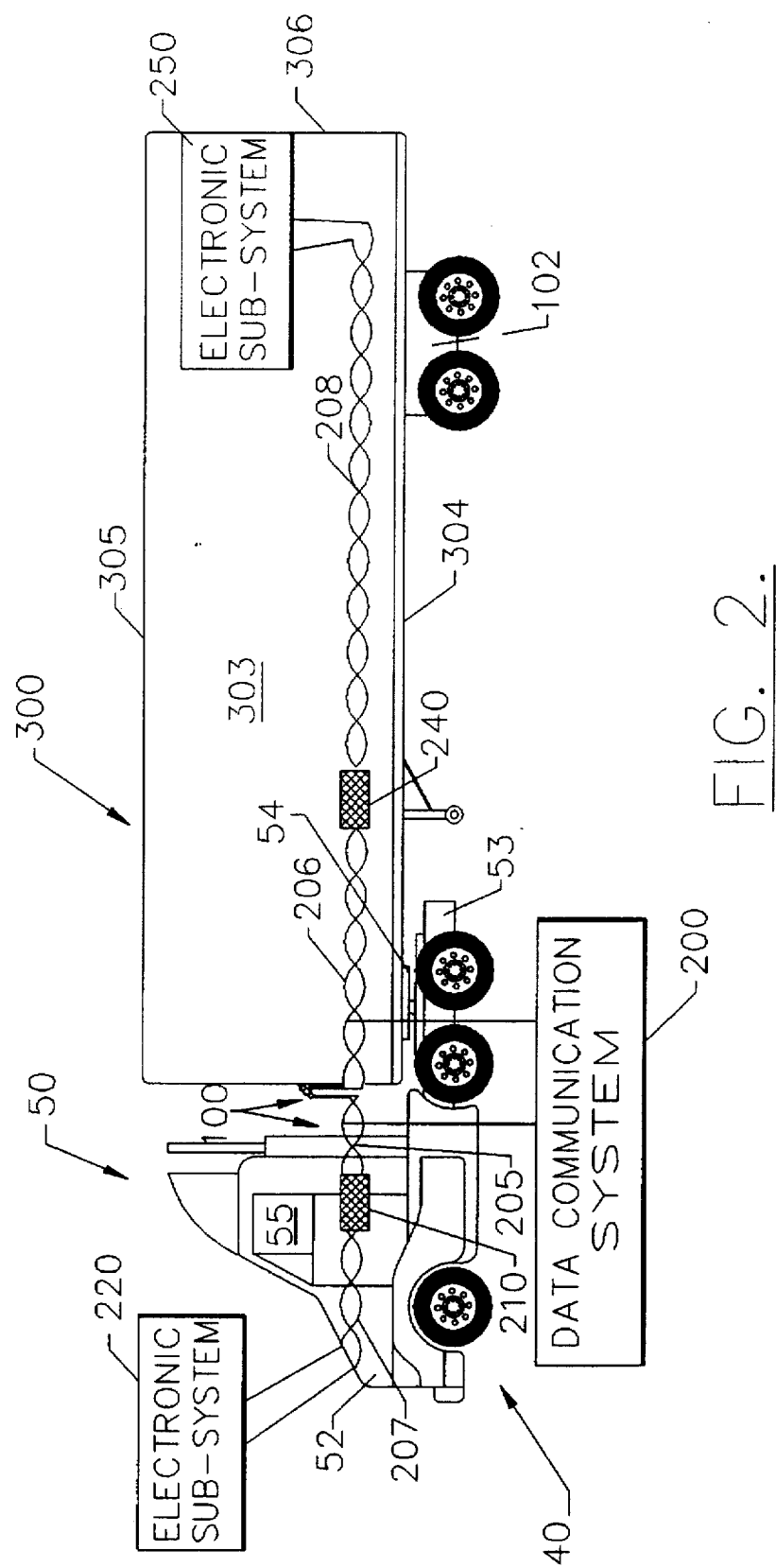
FIG. 2 illustrates a schematic view of a tractor/trailer combination including a data communications system using a pneumatic coupler according to the present invention.

FIGS. 1–2 illustrate a combination of a tractor 50 and a trailer 300 which includes an apparatus 40 for monitoring various operating conditions of at least the trailer 300 by a driver positioned on the tractor 50 according to the present invention. The trailer 300 preferably is coupled to the tractor 50 as illustrated for pulling the trailer 300. As understood by those skilled in the art, the tractor 50 and trailer 300 combination includes respective frames 53, 304 and means, i.e., trailer coupling member 54, for coupling the tractor 50 and trailer 300 together. In addition, the tractor 50 preferably includes an engine, such as a diesel engine or other driving means, positioned in a forward portion 52 of the tractor 50 for driving the tractor 50 to thereby pull the trailer 300 coupled thereto. The tractor 50 preferably is a cab-type tractor 50 having a cab 55, such as illustrated, for positioning a driver and/or passengers therein.

A display 225 (FIGS. 22–23), such as in the form of indicator lights, gauges, liquid crystal display, light emitting diodes, a CRT screen, and the like as readily understood by those skilled in the art, preferably is positioned on the tractor 50, i.e., in the cab 55 or mirrors attached thereto, for displaying information related to operating conditions of at least the trailer 300, and preferably the tractor 50 and the trailer 300. Also, the trailer 300 illustrated herein has a generally rectangular configuration formed by front and back walls 301, 306, top and bottom walls 304, 305, and a pair of side walls 302, 303. The bottom wall 304 of the trailer 300 illustrated also preferably includes a trailer frame as well. It will be understood, however, by those skilled in the art that various other configurations, sizes, and/or shapes of trailers, i.e., cylindrical, open top, refrigerated, also may be used according to the present invention for transporting and/or storing various types of cargo.

The tractor 50 and trailer 300 combination further preferably has a pneumatic braking system 100 carried by the tractor 50 and the trailer 300 to permit a driver to supply pneumatic braking pressure from the tractor 50 to the trailer 300. The pneumatic braking system 100 preferably includes at least one pair 105, 107 and 106, 108 of hoses, i.e., gas, air, hydraulic or other fluid hoses, respectively connected to the tractor 50 and the trailer 300, and a coupler 103, 104 connected to each pair 105, 107, and 106, 108 of the hoses. Each coupler 103, 104 has interconnecting first and second coupler portions 110, 160, such as illustrated, arranged to facilitate connecting and disconnecting the respective air hoses 105, 107 and 106, 108.

These pneumatic couplers 103, 104, i.e., "gladhand" couplers, are preferably positioned between and connected to the tractor 50 and the trailer 300. More particularly, the couplers 103, 104 have the first coupler portion 110 connected to an air hose 105 which is connected to or mounted to the tractor 50 at a hose mount 109 connected to a back portion 51 of the cab 55 and the second coupler portion 160 connected the front wall 301 of the trailer 300 and to an air hose 107 or other associated tubing. The air hose 107 provides a path of travel of the pneumatic pressure to brakes 102 associated with the trailer 300.

Each of the first and second coupler portions 110, 160 preferably includes a hollow body 111,161 arranged to be positioned in fluid communication with a fluid, such as various gases, air, and/or a liquid. The pneumatic braking system 100 as understood by those skilled in the art preferably further includes a pressure supply source 101 (not shown) preferably mounted to the tractor 50 which through the air hoses 105–108 supplies pressure to the brakes 102, i.e., air brakes, of the combination of the tractor 50 and the trailer 300, and more particularly to the trailer 300.

As illustrated in FIG. 1, one pneumatic braking line of the pneumatic braking system 100 preferably is the emergency line, i.e., supply or constant air, providing constant pneumatic pressure to the trailer 300. The other pneumatic braking line preferably provides a control signal, i.e., service, to the trailer 300 for service of the brakes 102. Although for brevity of description the emergency line has been illustrated in more detail, it will be understood by those skilled in the art that either or both braking lines may be used according to the present invention. Also, a gladhand pneumatic coupler is well known in the industry and has been specified by the Society of Automotive Engineering ("SAE") according to the standard number "J318." The SAE J318 standard for couplers is further hereby incorporated herein by reference. Accordingly, it will be useful in understanding the present invention to first understand a prior art SAE J318 gladhand coupler 30 as it has been used previously in the trucking industry (see FIGS. 3–5).

Figure 3:
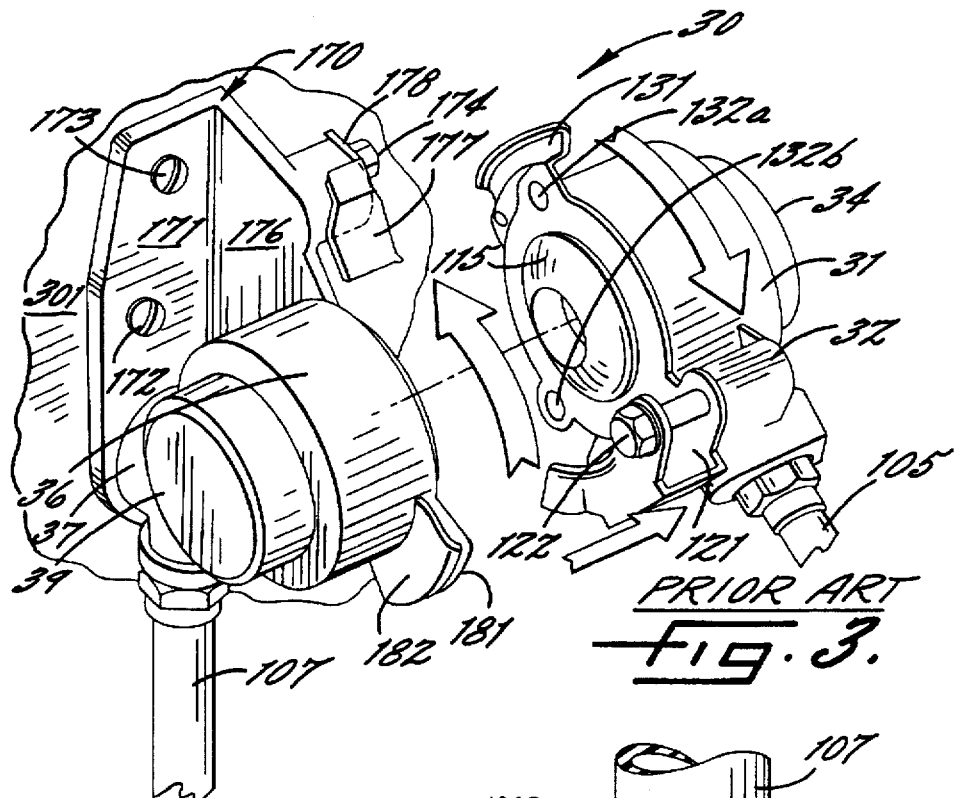
FIG. 3 illustrates an isometric exploded view of a prior art SAE J318 coupler.
Figure 5:
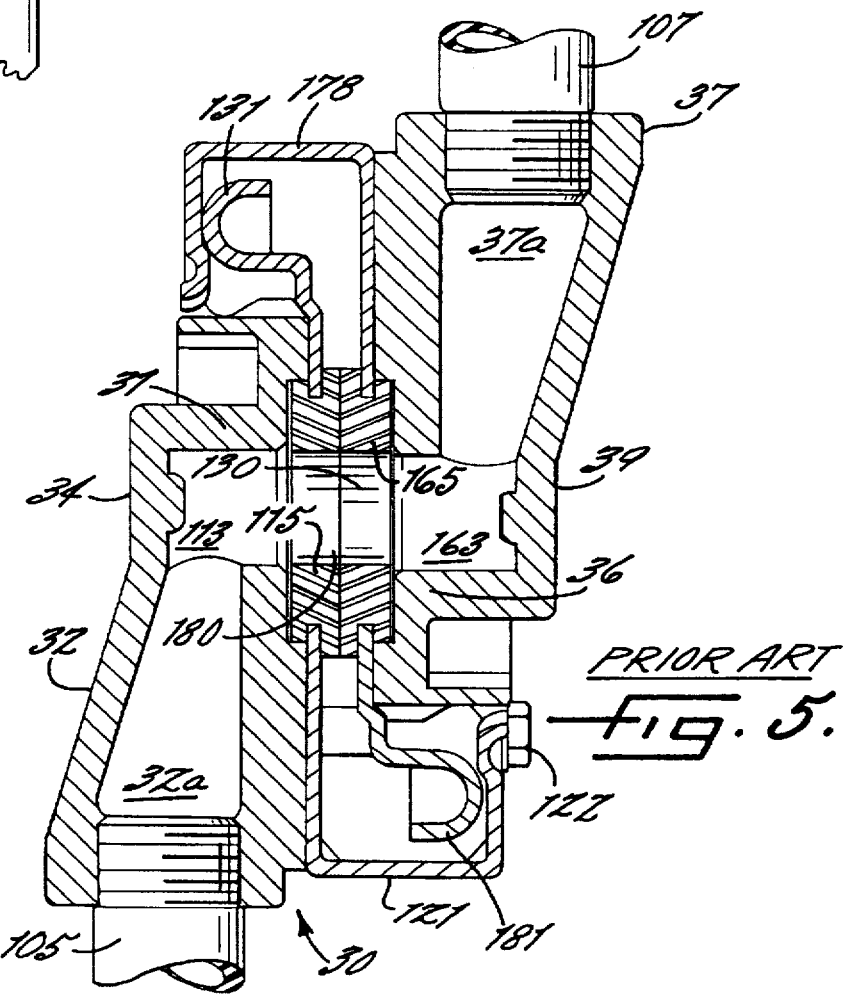
FIG. 5 illustrates a transverse sectional view of the prior art SAE J318 coupler shown in FIG. 2.
Figure 4A:
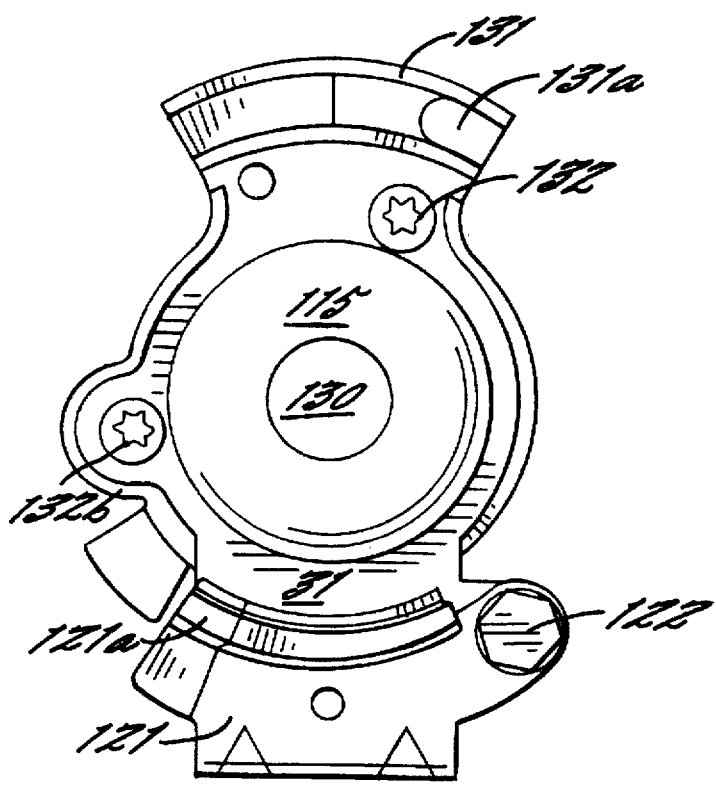
FIGS. 4A and 4B illustrate elevational views of first and second coupler portions of the prior art SAE J318 coupler of FIG. 2.
Figure 4B:
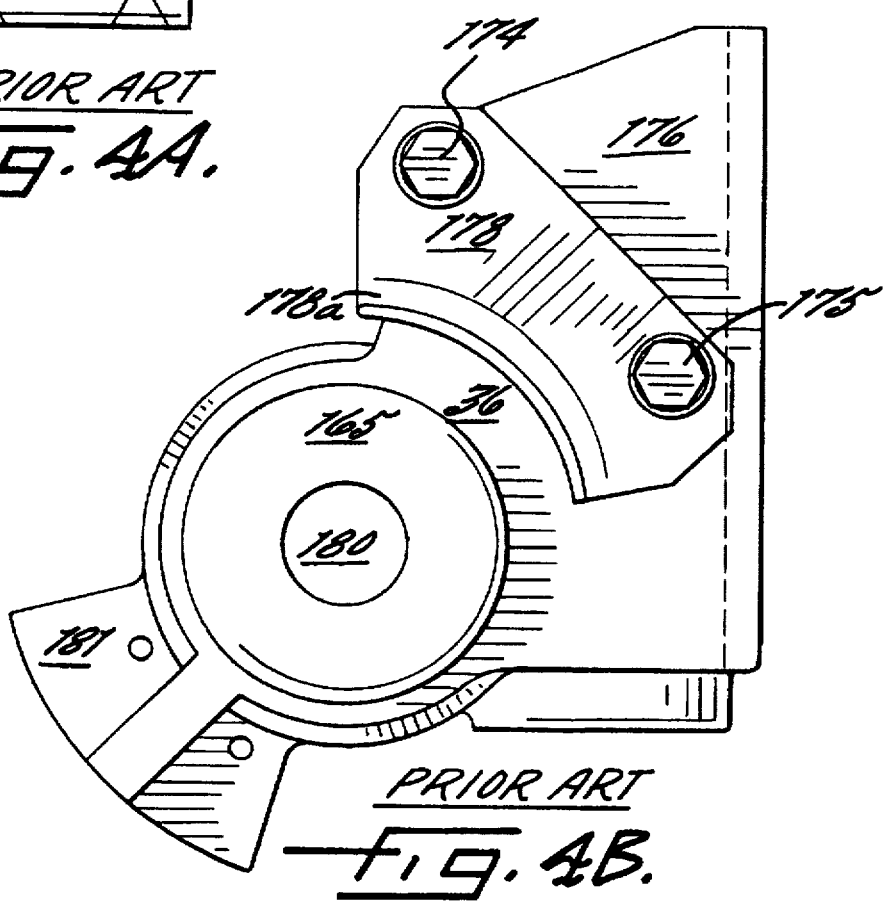

As illustrated in FIGS. 3–5, the SAE J318 coupler 30 includes first and second disengageable coupler portions 31, 36, i.e., moieties or halves, which, when interconnected or joined together, will be mounted on the tractor 50 or the trailer 300. In this fashion, one SAE J318 coupler 30 may be positioned on the tractor 50 or trailer 300, but alternately, there may be a SAE J318 coupler on the tractor 50 and the trailer 300 with a coiled or straight jumper hole or tubing, i.e., 105, 106, connecting more than one or the SAE J318 couplers 30 together when an application requires such an arrangement.

Each of the first and second coupler portions 31, 36 or 110, 160 (see also FIGS. 6–8) preferably includes a hollow body 111, 161 having a cavity 113, 163 formed therein. The first coupler portion 31 is provided with a body 111 to which a pneumatic air hose 105, 106 and a fitting 105a, 106a (not shown but similar to 105a) are attached to the coupler portion 31. The first air hose 105 preferably connects to an inlet port 32a or 117 positioned in fluid communication with the cavity 113 of the first coupler portion 31. The second air hose preferably 107 connects to an outlet port 37a or 167 of the second coupler portion 160 via an associated fitting 107a. The outlet port 37a or 167 is also arranged in fluid communication with the cavity 163 of the second coupler portion 36. The inlet and outlet ports 32a, 37a preferably are formed in respective lower body portions 32 or 112, 37 or 162 of the first and second coupler portions 31, 36 as illustrated. The second coupler portion 36 of the SAE J318 coupler 30 also has a body 161 arranged to be mounted to the trailer 300 using openings positioned in portions of the body 161.

In operation of an SAE J318 coupler 30 such as illustrated, the first and second coupler portions 31, 36 are interconnected or joined together with a frictional fit between respective elastomeric seals 115, 165 along front portions thereof and with respective interlocking upper and lower flanges 121, 131, 178, 181 which extend outwardly from the respective bodies 111, 161. The upper and lower flanges 121, 131, 178, 181 also include threaded fasteners 122, 174, 175 which secure the flanges 121, 178 to portions of the bodies 111, 161 and contact channels or portions 121a, 131a, 178a which contact opposing portions of a corresponding coupler portion 31, 36. End or capping members 34, 39 or 119, 169 (FIG. 8) also preferably are connected to or formed integral with the bodies 111, 161 of the first and second coupler portions 31, 36. The front portions of the first and second coupler portions 31, 36 respectively include openings or ports 130, 180 extending through the respective seals 115, 165 and to the respective cavities 113, 163 positionally aligned for fluid communications. The first and second coupler portions 31, 36 also have plate members 132, 137 integrally formed with the lower and upper flanges 121, 131. The plate members 132, 137 preferably also are secured to, i.e., via fasteners 132a, 132b, or integrally formed with the respective bodies 31, 36. A reinforcing plate member 182 preferably is secured to the lower flange 181 of the second coupler portion 31.

Additionally, the upper flange 178 has a wing flange member 177 integrally formed therewith that cooperates with and abuttingly contacts the upper flange 131 of the first coupler portion 31. Further, an L-shaped bracket member 170 having first and second legs 171, 176 is integrally formed with the body 161 of the second coupler portion 36 and receives the upper flange 178. The second coupler portion 160 preferably secures to the front wall 301 of the trailer 300 by threaded fasteners 172, 173 in the first leg 171 of the bracket member 170. It will be understood that various other connecting and positioning locations of the coupler 30 are also included according to the invention.

Figure 6:
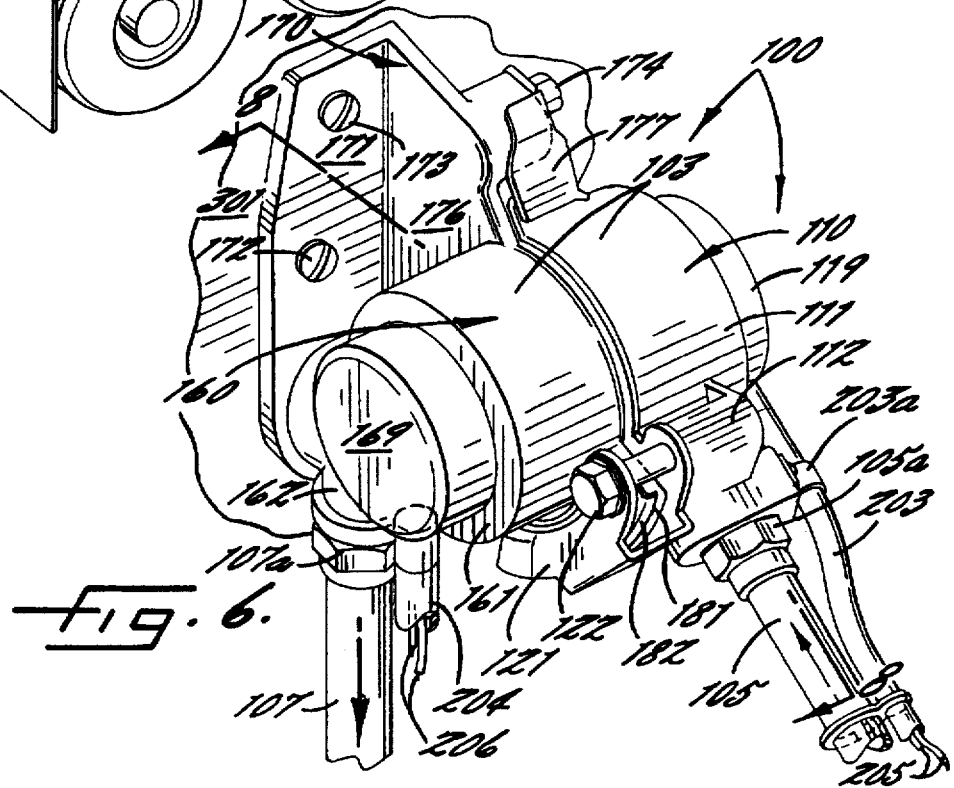
FIG. 6 illustrates a perspective view of a pneumatic coupler according to a first embodiment of the present invention.
Figure 7:
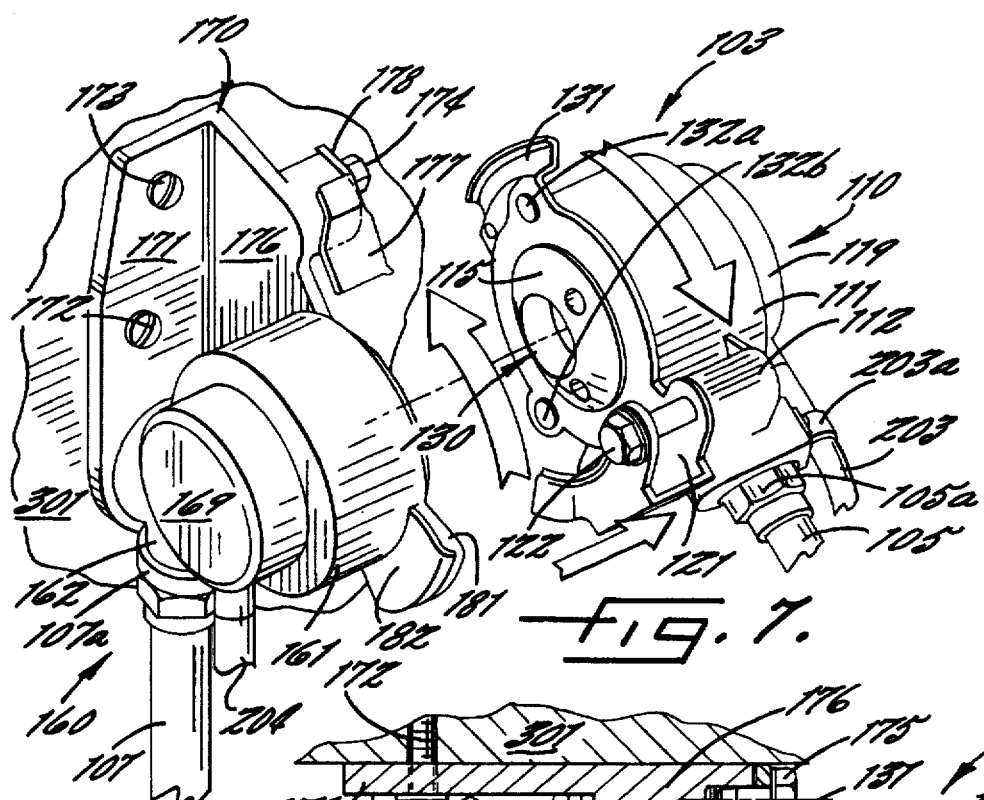
FIG. 7 illustrates an exploded perspective view of a pneumatic coupler according to a first embodiment of the present invention.
Figure 8:
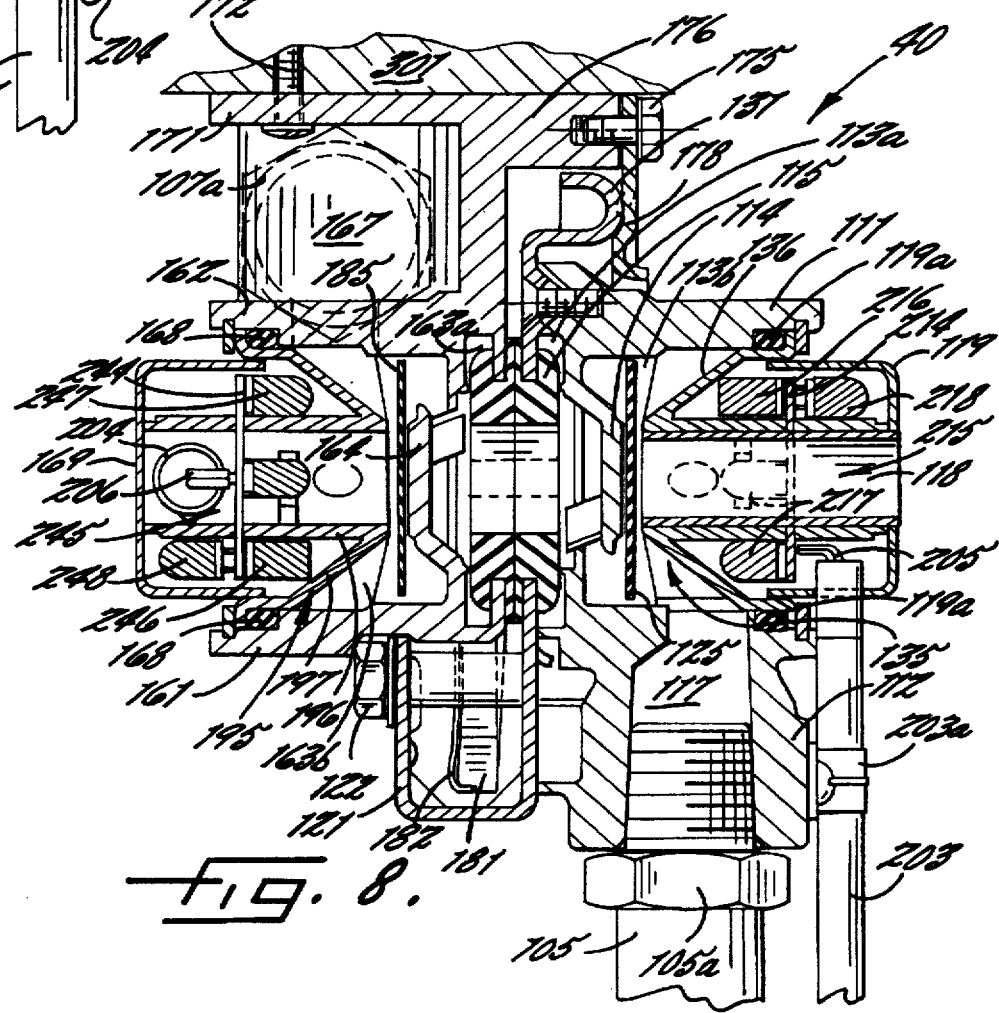
FIG. 8 illustrates a transverse sectional view of a pneumatic coupler taken along directional line 8 of FIG. 6.

As best illustrated in the various embodiments of FIGS. 6–19, a coupler 103 provided in accordance with the present invention is described. Like elements in the various embodiments are designated with prime ('), double prime ("), and triple prime notation ("') for clarity purposes. The coupler 103, 103', 103" also includes interconnecting first and second coupler portions 110, 110', 110", 160, 160', 160" or 140, 190 similar to and compatible with an SAE J318 standard coupler 30 such as described (FIGS. 6–7). Accordingly, for clarity and brevity of explanation, those elements similar to the SAE J318 coupler 30, including the elastomeric seals 115, 165, will be readily understood by those skilled in the art and need not be repeated throughout the description of these various embodiments. The emphasis in the remaining portions of the description of the coupler 103 will be related to the retrofitting or equipping the standard SAE J318 coupler 30 with portions of a data communications system 200 of the invention.

As illustrated in FIGS. 7–27, the apparatus 40 in combination with the tractor 50 and trailer 300 combination of the present invention also has a data communications system 200 which includes respective transceivers 215, 245, i.e., at least one transmitter and at least one receiver, carried by the first and second coupler portions 110, 160 of the coupler 100 and which are arranged for communicating signals representative of monitoring data from the trailer 300 to the tractor 50 so as to in turn be monitored by a driver positioned on the tractor 50, i.e., in the cab 55. The first and second transceivers 215, 245, and the term "transceiver" more particularly, will be understood to include various means for transmitting and/or receiving signals representative of monitoring data related to various operating conditions of the tractor 50 and/or the trailer 300. The first and second transceivers 215, 245 are preferably respectively positioned in the hollow bodies 111, 161 of the first and second coupler portions 110, 160. The monitored data is representative of the operating conditions of various components of the tractor 50 and/or trailer 300 and/or cargo integrity and conditions as further described herein. Although the first and second coupler portions 110, 160 each respectively include at least one transceiver 215, 245, more than one infrared transceiver device 215a, 215b (see FIG. 23) is preferably included in each coupler portion 110, 160 to provide redundancy and to compensate for dirt or corrosive build up in and around the bodies 111, 161 of the coupler portions 110, 160. The first and second coupler portions 110, 160 may be either customized couplers preferably having the gladhand configuration or may be a standard gladhand coupler 30 retrofitted or equipped for carrying the transceivers 215, 245 of the data communications system 200 according to the present invention.

According to the invention, as illustrated in FIGS. 8–16, a first transceiver 215, i.e., preferably an infrared transceiver, is positioned within a cavity 113 of the body 111 of the first coupler portion 110 and is arranged to transmit and receive data to and from first and second controllers 210, 240 of the data communications system 200. A corresponding second transceiver 245 is also positioned within a cavity 163 of the body 161 of the second coupler portion 160. The first and second transceivers 215, 245 preferably each have a plurality of transmitters, i.e., light emitting diodes ("LEDs") 217, 246, 247 mounted to respective printed circuit boards ("PCBs") 214, 244. Receivers, i.e., photodetectors 246, 246, are also mounted to the PCBs 214, 244 as illustrated. The various drive, filtering, and amplification circuitry, as well as other desired circuitry such as oscillators, microprocessors, power supplies, preferably is mounted to the PCBs 244, 244, i.e., using surface mount technology, as understood by those skilled in the art. This circuitry preferably includes compensation means for compensating for dirt and for corrosive build-up on the coupler portions 110, 160 which may otherwise inhibit data communications. The compensation means is preferably accomplished by an infrared receiver amplifier and feedback circuit, although other various drive circuitry understood by those skilled in the art may also be used.

The first and second PCBs 214, 244 are preferably mounted within respective plugs 135, 195 positioned within the cavities 113, 163. The PCBs 214, 244 are also electrically connected to twisted pair cable 205, 206 extending through respective tractor and trailer conduits 203, 204 and which are connected to the lower body portions 112, 162 of the first and second coupler portions 110, 160 by cable fasteners 203a, 204a. First and second elastomeric and translucent members or valves 125, 185 preferably are positioned between the plugs 135, 195 and the first and second openings or ports 130, 180 so that light transmitted by the LEDs 217, 246, 247 easily passes to the other corresponding coupler portion 110, 160 through the openings 130, 180 therein. The valves 215, 185 also allow light transmitted from the respective coupler portions 110, 160 to be received by the respective photodiodes 216, 246. The PCBs 214, 244 each also have at least one LED 218, 248 arranged to provide conspicuity to be used for diagnostic purposes such as when diagnosing a subsystem performing condition. The PCBs 214, 244 may also have a plurality of LEDs 218" (see FIG. 14) arranged to provide a lighting configuration, i.e. marker and/or flashlight effect, such as when the first coupler portion 110 is disconnected from the second coupler portion 160.

The plugs 135, 195 each have forward portions 136, 196 thereof with a generally frusto-conical shape integrally formed with plug base members 137, 197. The plugs 135, 195 preferably are positioned in rearward portions 113b, 163b of the cavities 113, 163. The cavities 113, 163 each respectively are separated by a dividing wall 114, 164 which separates the cavities 113, 163 into forward 113a, 163a and rearward 113b, 163b portions. An o-ring member 119a, 168 positioned in the rearward portion 113b, 163b facilitates the positioning of the plugs 135, 195 therein. An exhaust port 118 is also illustrated in this embodiment of the coupler 103 in the first coupler portion 110 which cooperates with the valves 125, 185 to provide a quick pressure release function as understood by those skilled in the art. It will also be understood according to this invention that other SAE J318 standard couplers without the quick release function as illustrated herein may also be used.

The first controller 210 of the data communications system 200 preferably is carried by the tractor 50, and the second controller 240 preferably is carried by the trailer 300. It will be understood by those skilled in the art that only one controller 210 or 240 carried by either the tractor 50 or the trailer 300 may be used or more than two controllers may also be used according to the present invention. The first and second controllers 210, 240 communicate via a data communications channel or link provided via transmitting and receiving means associated with at least one of the pneumatic couplers 103, 104 which are preferably compatible with a SAE J318 coupler, i.e., "gladhand," as described herein. The first and second controllers 210, 240 permit the implementation of sophisticated control and monitoring of various conditions between the tractor 50 and the trailer 300. An electronic subsystem 250 or data-producing or other signal generating means is carried by the trailer 300. Similarly, an electronic subsystem 220 may also be carried by the tractor 50. These electronic subsystems 220, 250 preferably are connected to the respective controllers 210, 240 via the twisted pair cable 205, 206, as shown in the schematic diagram of FIG. 2. The twisted pair cable 205, 206 illustrated preferably is respectively carried by a tractor emergency line conduit 203 and a trailer emergency line conduit 204. The tractor emergency line conduit 203, as best illustrated in FIG. 17, preferably is reverse coiled and connected to the air hose 205 by fasteners 205a, 205b. The twisted pair cable 205, 206 may also be positioned within the air hoses 105–108 of the pneumatic braking system 100 according to the present invention (see FIGS. 16 and 19).

Figures 9, 10:
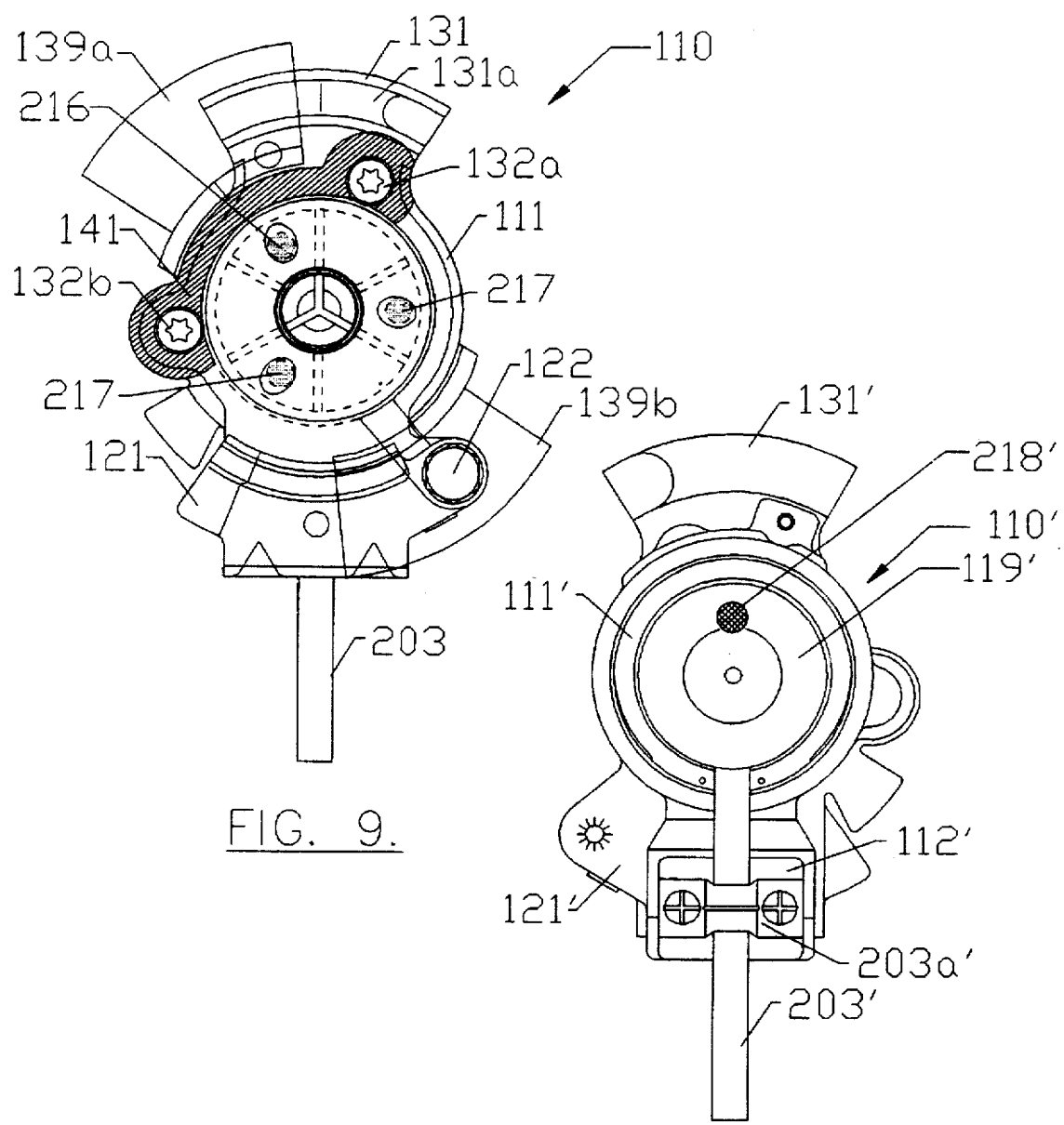
FIG. 9 illustrates a front isometric view of a first pneumatic coupler portion according to a first embodiment of the present invention.
FIG. 10 illustrates a rear isometric view of a first pneumatic coupler portion according to a second embodiment of the present invention.
Figure 13:
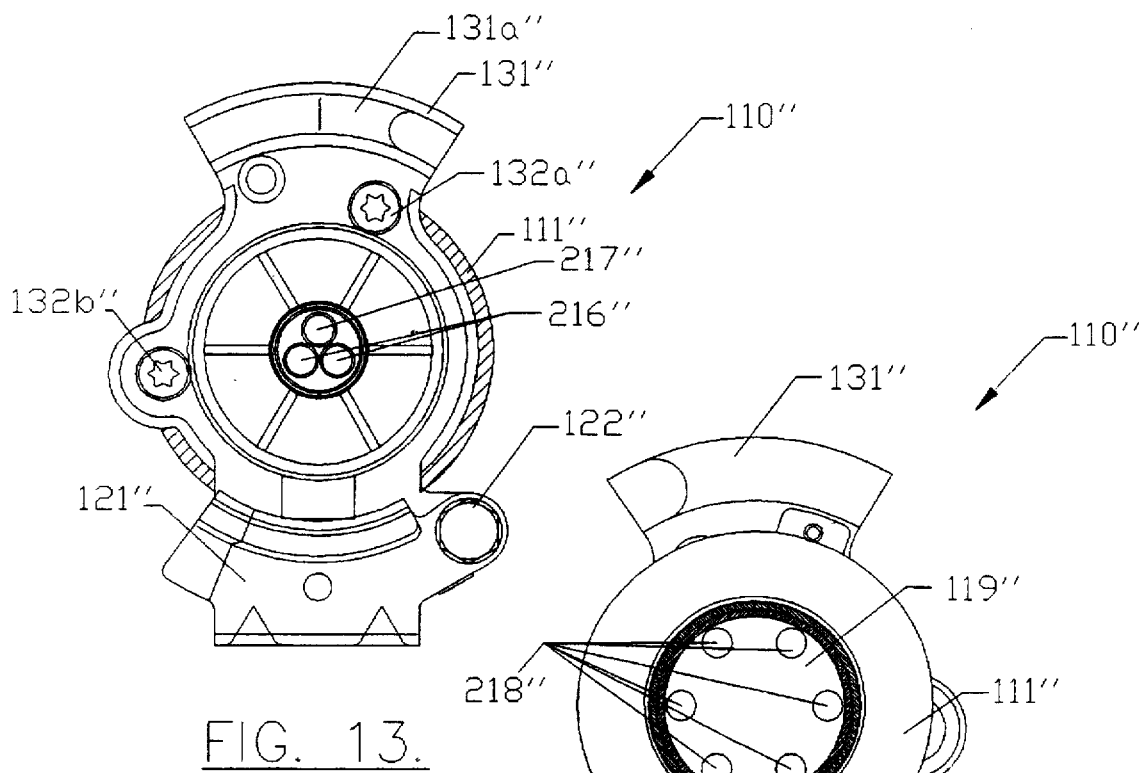
FIG. 13 illustrates a front isometric view of a second pneumatic coupler portion according to a third embodiment of the present invention.
Figure 14:
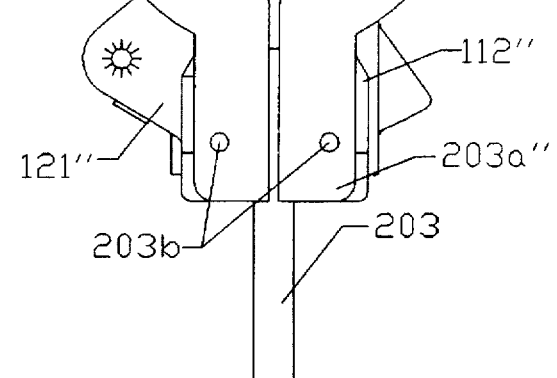
FIG. 14 illustrates a rear isometric view of a second pneumatic coupler portion according to a third embodiment of the present invention.
Figure 15:
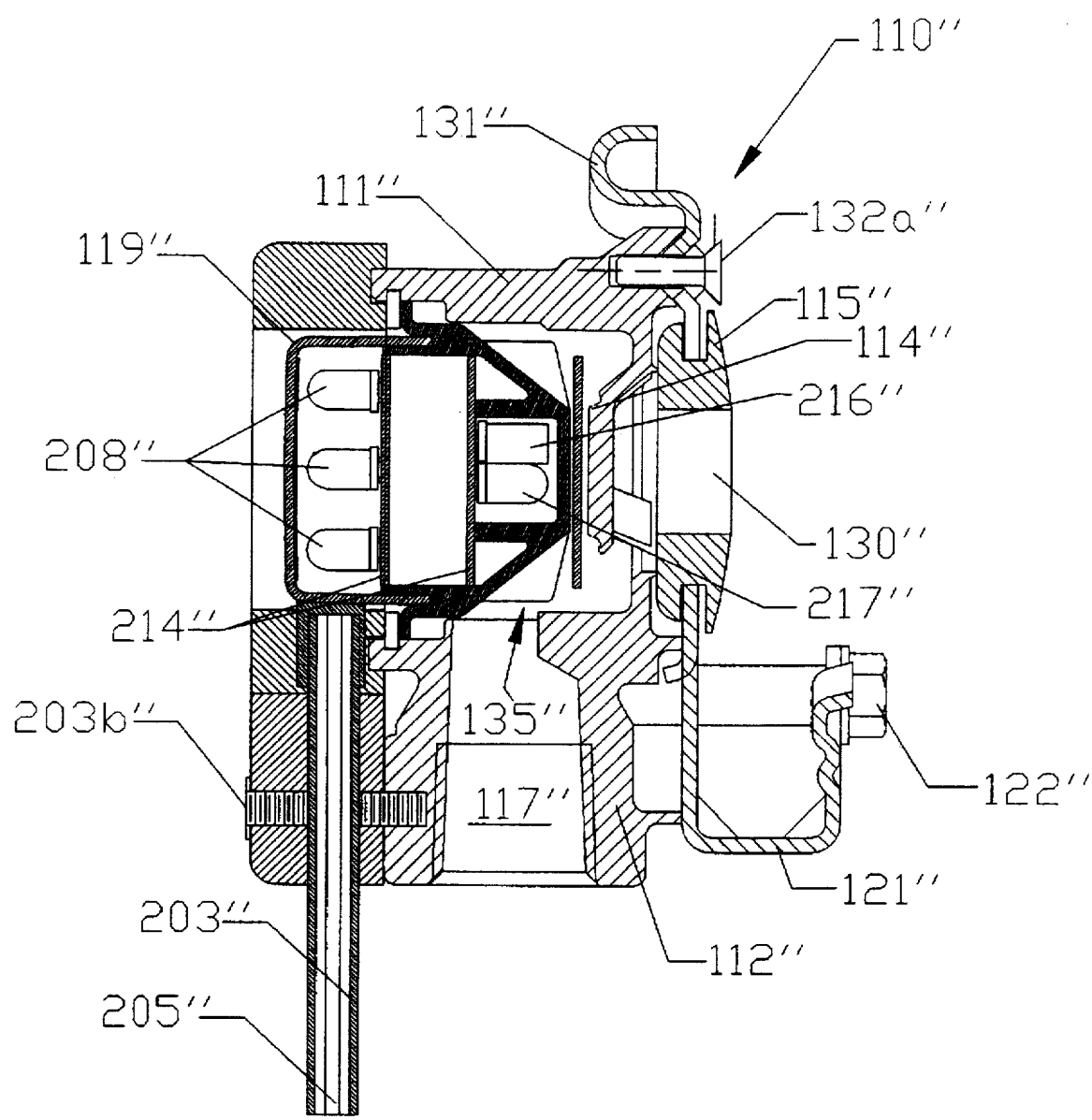
FIG. 15 illustrates a vertical sectional view of a first pneumatic coupler portion according to a third embodiment of the present invention.
Figure 16:
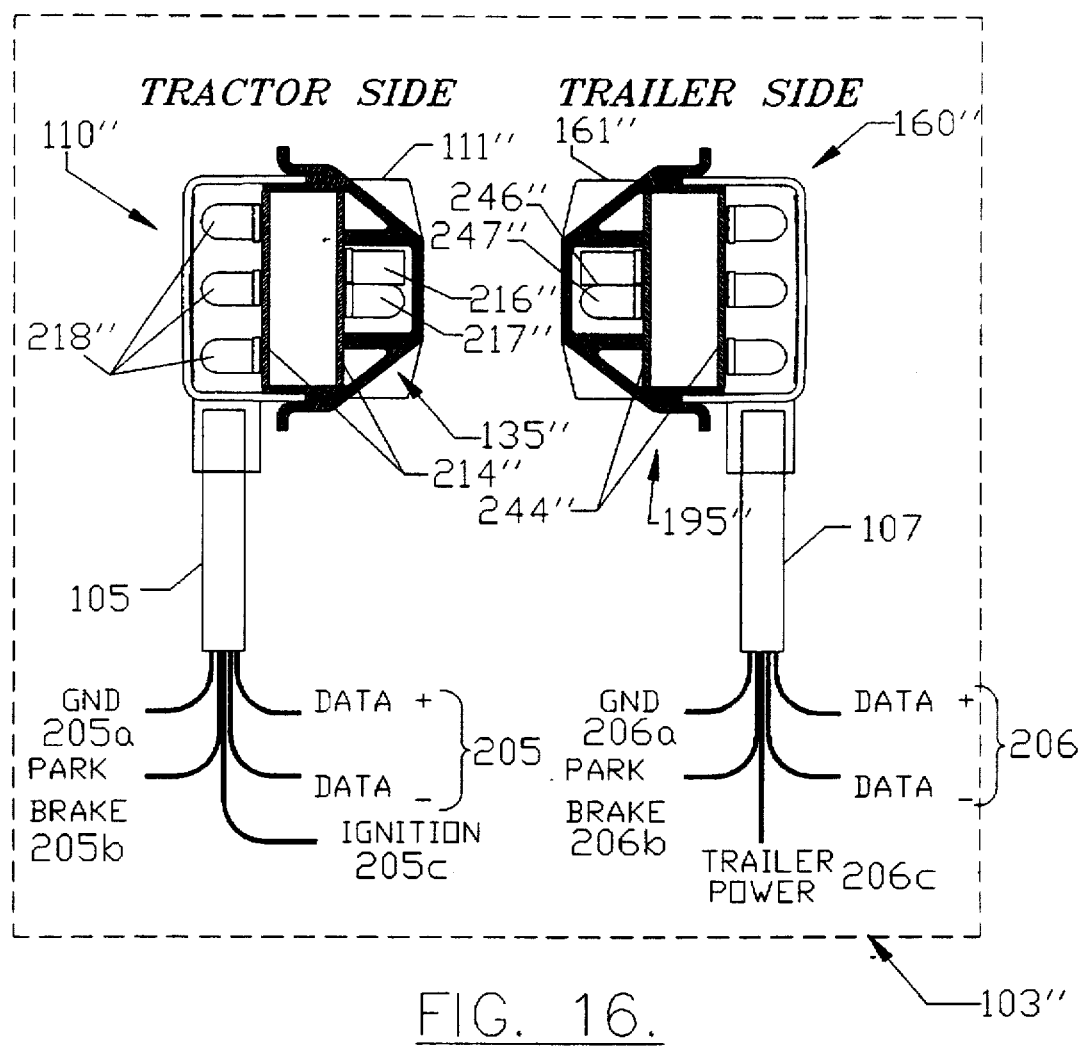
FIG. 16 schematically illustrates a side plan view of a pneumatic coupler according to a fourth embodiment of the present invention.
Figure 17:
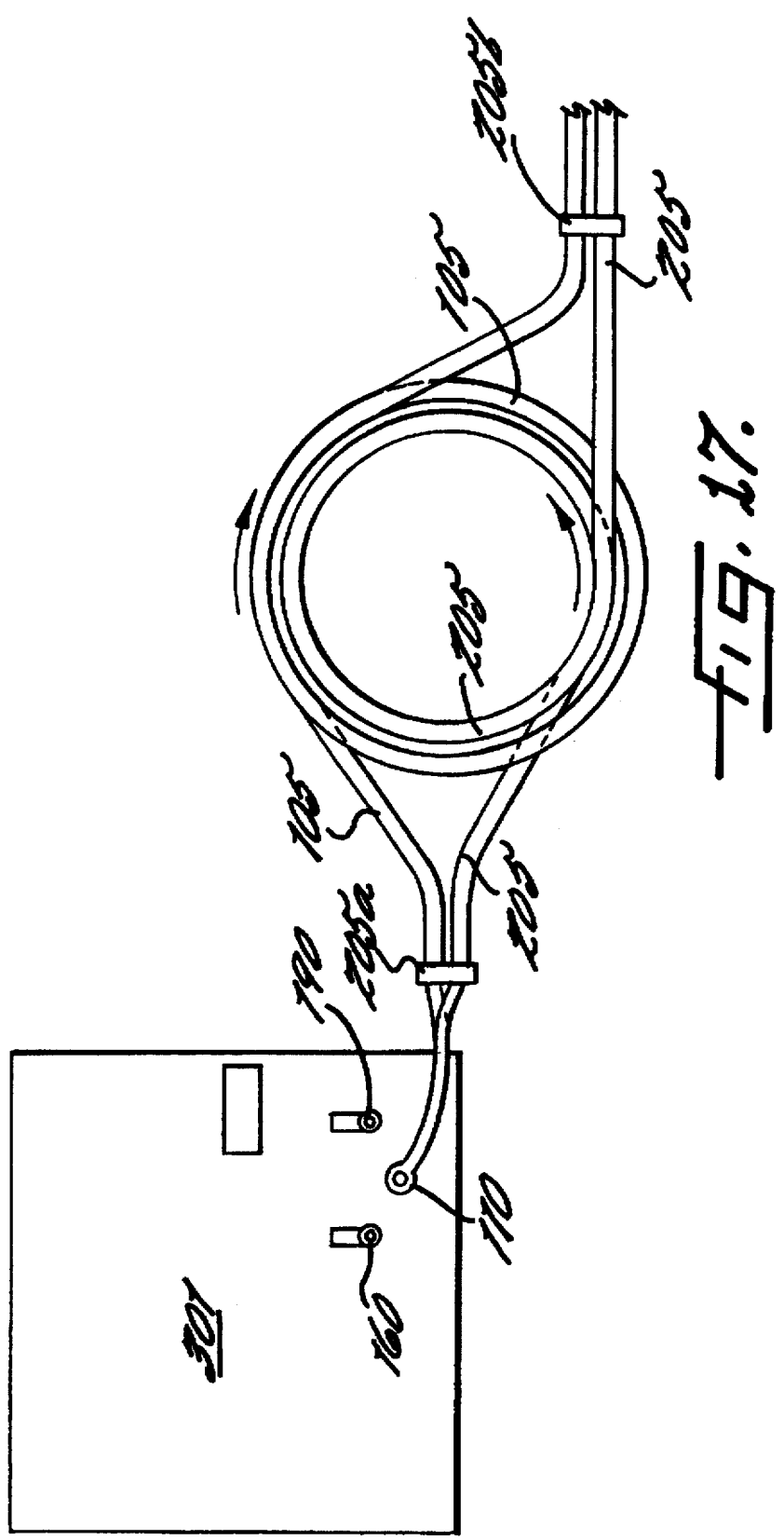
FIG. 17 illustrates a schematic diagram of an pneumatic air hose extending from a tractor toward a trailer and carrying cable for a data communications system according to the present invention.

The present invention also includes positioning various data communications and power connections so as to be carried by the pneumatic coupler 103 (see FIGS. 9 and 16). In this embodiment, a power supply system 227 (see FIG. 20) is connected to the first and second coupler portions 110, 110", 160, 160" and is arranged to supply power from the tractor 50 to the trailer 300. As illustrated, the cables 205, 206 may include ground 205a, 206a, parking brake 205b, 206b, ignition 205c, and/or trailer power 206 wires or cable carried by the air hoses 105, 107, i.e., positioned therein. The power connection is preferably arranged through portions, i.e., upper flange portion or retainer 141, of the upper and/or lower flanges 121, 131, 178, 181 which abuttingly contact each other. As understood by those skilled in the art, portions of these flanges 121, 131, 178, 181 also may be insulated or covered for protective purposes if desired.

Accordingly, although embodiments of optical communication, i.e., infrared, electro-mechanical communication, i.e., inductive, and power connections are illustrated and described, it will be understood that other types of data communications transmitting and receiving technologies and power connections also may be carried by the coupler 103, 103', 103", 103''' according to the present invention, such as radio frequency, microwave frequency, acoustic, video communication such as through light transmitters and receivers, laser and visible optical communication, electromagnetic, capacitive, as well as various other power and data communications technologies. The data communications channel, or channels, of the present invention is preferably interfaced with at least one SAE J318 compatible pneumatic coupler 103, 104 which preferably serves in the present embodiment to electrically link portions of the data communications system 200 as well as preferably the previous electrical power link (see FIGS. 9 and 16) needs which have heretofore been necessary in a tractor/trailer vehicle combination 50, 300.

In yet another embodiment of the coupler 103''' as illustrated in FIGS. 18–19, a signal produced in the tractor/trailer combination 50, 300 is interfaced to one of the pair of transceivers 215''', 245''' to set up in a first coil to form a magnetic field corresponding to the signal to be transmitted. The magnetic field is then communicated to the second coil which is adapted to receive the magnetic field and to have induced in it a voltage corresponding to the signal. The voltage signal is then received by the second controller 240 in the trailer 300 so that data can be effectively communicated and used. In the illustrated fifth embodiment, the transceivers 215''', 245''' each include a plurality of wire turns arranged so that the transceivers 215''', 245''' are positioned in substantially parallel relation when the first and second coupler portions 110''', 160''' are interconnected (see FIGS. 6 and 9).

FIG. 19, in particular, illustrates a cross-sectional view of the coupler 103''' provided in accordance with the present invention, including the first and second transceivers 215''', 245'''. The first coil of the first transceiver 215''' is mounted in the first coupler portion 110''' by preferably winding the coil from wire on or embedded into the lower body portion 112''', 162'''. Similarly, in the second coupler portion 160''', the second coil of the second transceiver 245''' is similarly wound and mounted to the shell or housing of the second coupler portion 160'''. A length of twisted pair cable 205, 206 or 205''', 206''' is connected to the transceivers 215''', 245''' and extends to the respective controllers 210, 240. It will be recognized by those with skill in the art that other communication cables such as coaxial cables, twin axial cables and others, could be used in place of the twisted pair cable 205''', 206'''. When the first and second coupler portions 110''', 160''' are interconnected or joined together as best shown in FIG. 19, communication across the coupler 103''' is possible by inducing voltages in the transceivers 215''', 245''' as described above. In other words, the transceivers 215''', 245''' act in a transformer arrangement as the primary and secondary windings of a transformer, respectively. The coupler 103''' according to the present invention thereby permits data communication across a coupler 103''' with the SAE J318 standard configuration or arrangement.

In the first and second controllers 210, 240 illustrated, a data waveform may be impressed upon a 2.5 megahertz ("MHz") sine wave carrier by amplitude modulation ("AM") provide a modulation scheme. The modulation is preferably carried out such that a low level data bit referred to as a "space condition" results in full amplitude transmission, while a high level or "mark condition" results in a zero amplitude transmission. Demodulation of the data is preferably accomplished by the commonly known technique called "diode detection" wherein the modulated carrier is passed through a portion-wave circuit which acts as a low pass filter such that the high frequency carrier is blocked, leaving the low frequency data to pass through the circuit. In point-to-point (one tractor 50 and one trailer 300) communications, AM is the preferred method to encode the data in this third embodiment. Other encoding techniques will also be readily usable, and those with skill in the art will be able to readily execute such techniques with circuits provided in accordance with the present invention.

If modulation is desired in the data communications system 200 of the data signals transmitted and received between the tractor 50 and the trailer 300, then frequency shift keying ("FSK") and spread spectrum are the preferred modulation schemes in a multidrop network because multiple controllers 240, 240', 240" (see FIG. 26) can be connected in series or in parallel. A multidrop network might exist, for example, when a tractor 50 tows more than one trailer 300. A series of trailers 300 also all may be inductively coupled to a single tractor controller 210, as shown in FIG. 27. Each of respective trailers 300 would have its own unique identification address.

Figure 24:
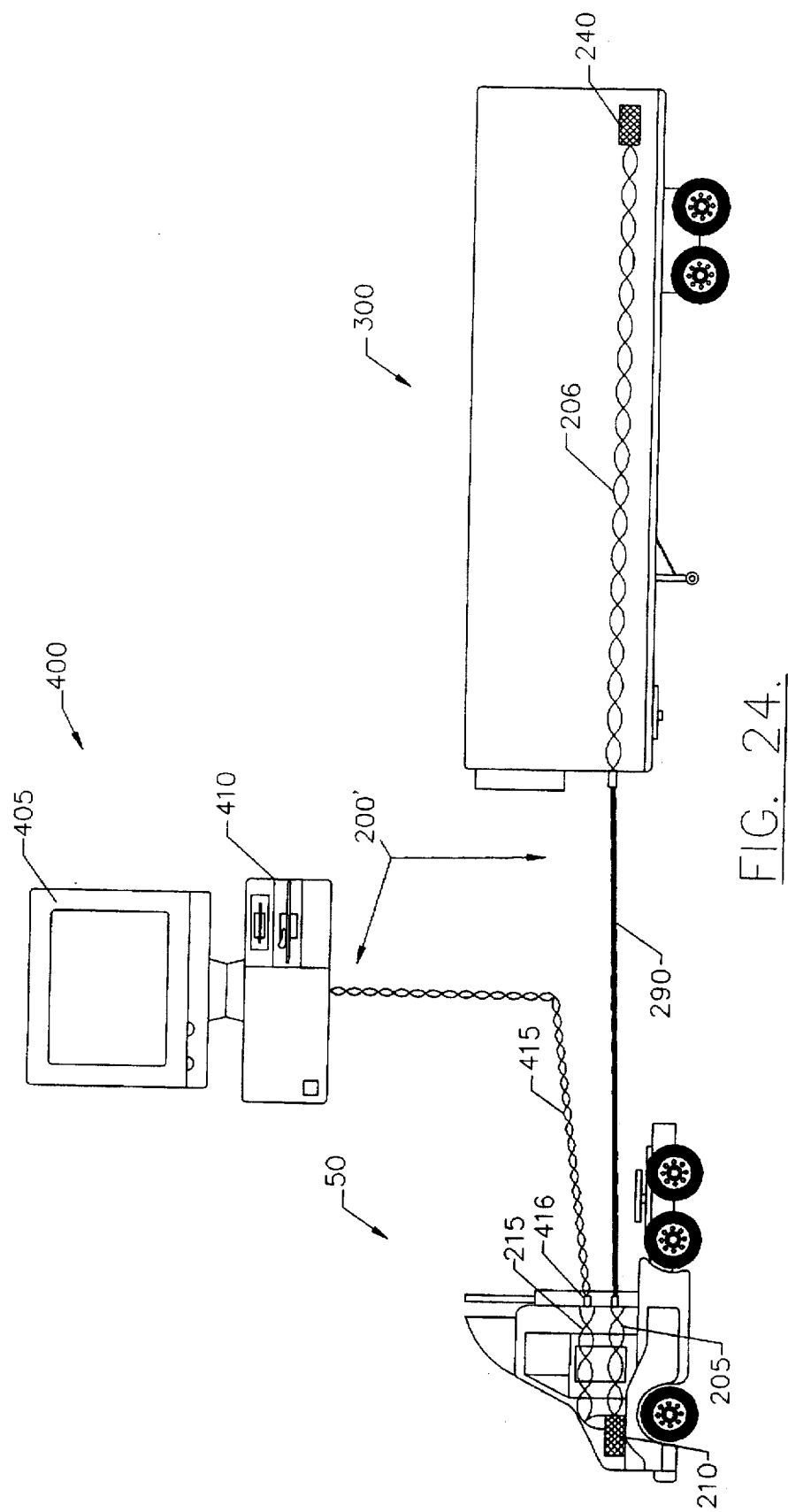
FIG. 24 illustrates a schematic diagram of a data communications system interfaced with an external controller according to the invention.
Figure 25:
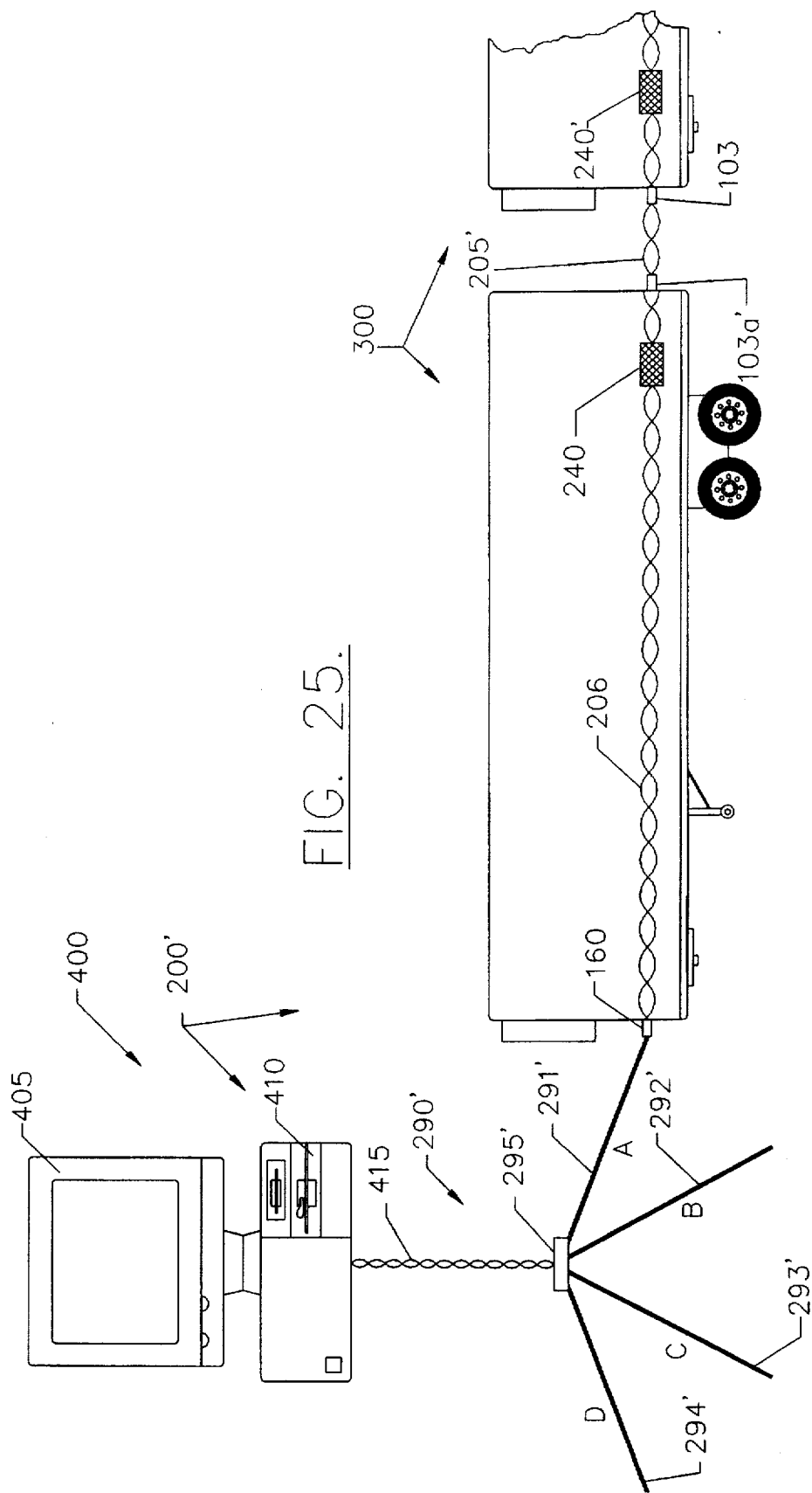
FIG. 25 illustrates a schematic diagram of a controller of a data communications system interfaced with an external controller according to the present invention.

Alternatively, a multidrop network could also be advantageously used for a railroad train carrying multiple trailers on its flat cars. For example, some subsystems in refrigerated trailers carrying perishable goods would still be monitored or controlled. Referring to FIGS. 24–25, an external controller 400 is shown connected to a number of trailers 300 (not shown) by a number of parallel lines A–D. The external controller 400 preferably includes processor means for storing and retrieving data from each controller 240, 240' of the respective trailers 300. A communications connector using infrared or inductive transceivers 215, 215''', 245, 245''' as described herein also permits multiple trailer connection. Thus, the infrared or inductive transceiver 215, 215''', 245, 245''' in accordance with the present invention permits the establishment of a bi-directional communications, bi-level voltage channel across a coupler 103, 103''' compatible with the SAE J318 standard.

Referring again to FIGS. 18–19, the illustrated inductive circuits are magnetic or inductive in nature and thus operate on the principle of mutual magnetic or inductance known to those with skill in the art. As shown in FIG. 19, the coupler includes two multi-turn coils made of electrically conducting wire which are brought into close but non-contacting relation, that is, into inductively coupled relation. A time variant voltage ($V_1$) modulated by the information to be conveyed is applied across coil which causes a time variant current to flow in coil in accordance with the well known physical relationship:

$$V_1 = L \cdot DI/dt,$$

where $V_1$ is the applied voltage, L is the coil self-inductance, I is the current, and t is time.

The time variant current, I, through the coil causes a proportional time variant magnetic field to be set up parallel with and through the coil axis. This time variant magnetic field causes a time variant voltage to be induced in the other coil in close proximity to the first coil in accordance with the well known magnetically induced voltage law:

$$V_2 = -N \cdot d\phi/dt,$$

where N is the number of turns in coil, and $\phi$ is the magnetic flux from the first coil passing through the area enclosed by the turns, N, of the second coil.

When the coils are perfectly coincident such that all the flux generated by one coil passes through the other coil, the system is referred to as an "ideal transformer." In this case, the voltage impressed upon coil is reproduced through the second coil in direct proportion to the ratio of turns of the two coils.

When the two coils are not perfectly coincident, however, some of the flux generated by one coil does not pass through the second coil. The voltage induced in the coil is thus less than that given by the turns ratio of the coils. The portion of coil self-inductance which is not mutually coupled to the other coil is referred to as the system's "leakage inductance" and represents a loss term in the network analysis.

In order to minimize the signal loss at the output $V_2$ due to the voltage drop across the leakage inductance, the two leakage components are preferably reactively tuned out at the carrier frequency by the addition of series tuning capacitances, $C_1$ and $C_2$, on each coil. The capacitance values $C_1$ and $C_2$ should be chosen so that the resulting resonance of the series capacitance and inductance combinations will result in the leakage being removed from the equivalent circuit. Thus, all the signal voltage $V_1$ applied to coil will be reproduced across coil as voltage $V_2$. Naturally, there will be resistive loss components which will also result in signal losses which cannot be tuned out. Consequently, there will always be a resistive loss of signal amplitude in this circuit.

The coils of the first and second coupler portions 110''', 160''' may be wound using 30 gauge enamel insulated, solid copper wire to achieve equal self-inductance in the coils.

This produced an inductance of about 25.5 µH wherein an inner coil preferably requires 21 turns, and the outer coil preferably requires 18 turns. Since the mutual inductance M is the same for both coils, the leakage inductances $L_1-M$ and $L_2-M$, are also equal.

With a 65% coupling coefficient, for example, the leakage inductance is given by:

$$L_1-M=L_2-M=(1.00-0.65)\times 25.5\ \mu H=8.9\mu H.$$

This leakage inductance is tuned out at the carrier frequency with the addition of resonant capacitances of about 455 pF in series with each coil. The reactance of the remaining mutual inductance, $X_M$, is substantially about 260 Ω and the loss resistance associated with each coil is on the order of about 13 Ω.

It is apparent that the coupler housing or end cap housing the coils must of necessity be made of an electrically non-conductive material. The time variant magnetic field of the coils will induce eddy currents into any adjacent conductive materials, and the finite resistance of the materials under the influence of these currents will represent a large loss component in the system.

It will be readily appreciated by those skilled in the art, that the length of twisted pair cable 205, 206 will exhibit distributed circuit characteristics of electrical transmission lines when the cable length approaches 1/16 of the electrical wave length. The wave length of a 2.5 MHz carrier is about 394 feet, and so the transmission line effects will be observed in any length of twisted pair cable in excess of about 25 feet. Since cable lengths in excess of 90 feet may be anticipated in a typical tractor/trailer combination, transmission line practices should be employed.

A transmission line which is not terminated by an impedance equal to its own characteristic impedance will exhibit reflections of an applied incident voltage waveform. The reflected wave will in turn set up a voltage standing wave pattern wherein the peak voltage goes off from a maximum as the distance from the voltage source is increased. The voltage standing wave pattern amplitude will drop off to a minimum at a distance equal to about ¼ of the wavelength from the source, and rise to a maximum again at a portion of the wavelength from the source, where the wave will repeat itself. Thus, a system which exhibits a substantial standing wave pattern will require calibration of the MODEMS in each for each configuration of transmission line length.

In order to minimize the effect of standing wave patterns on transmission signal amplitude for the entire range of applicable transmission lengths, the MODEMS must present an input and output impedance as closely matched as possible to the characteristic impedance of the twisted pair cable 205, 206. In preferred embodiments, the characteristic impedance of twisted pair cable 205, 206 will be about 120 Ω.

It is equally important that the reactance of the mutual coil inductance be insignificant compared to the characteristic impedance of the cable or the terminal impedance will no longer match the cable characteristic impedance. The reactance of the mutual inductance of prototype connectors tested in accordance with the present invention was about 260 Ω, which was about twice the characteristic impedance of the cable. This is not an insignificant reactance; however, by increasing the number of turns in the coils, thus the mutual inductance and reactance, resistive loss components are introduced to the system which themselves become significant compared to the characteristic impedance. The selection of coil inductance should therefore preferably be based upon an optimization of signal amplitude between the divergent effects of mutual reactance and the cable termination and reactive loss components in the coil assemblies.

The mutual reactance and resistive loss effects become pronounced with an increase in carrier frequency, that is, the transmission line effects become increasingly influential with increasing frequency at ever shorter cable lengths. Similarly, resistive loss components become substantially more pronounced as a result of the higher frequency magnetic properties of the materials. Demodulation of the data signal, however, is a relatively simple process if the carrier frequency is several orders of magnitude higher than the data frequency, but will become more complicated as the two frequencies approach one another. Accordingly, the selection of the carrier frequency should be based on an optimization of the cost, complexity and performance between the divergent effects of frequency on demodulation, and magnetic physics and transmission line effects.

A coupler 103 and other communication channel components provided in accordance with the present invention allow the interconnection of intelligent computer systems on a vehicle such as tractor/trailer combinations 50, 300. Since prior SAE J318 couplers are routinely subjected to the harshest environmental conditions, including temperature extremes, severe vibration, dirt and corrosive atmospheres, it is not uncommon to find that dirt buildup and/or loosening of the contacts from prolonged excessive vibration in the current have reduced the integrity of the connection to the point where subsystems on the tractor/trailer 50, 300 are non-functional. Furthermore, oxidation of contacts is expected which is usually counteracted by the high currents passed through the bodies 111, 161 of the coupler portions 110''', 160''' in the fifth embodiment illustrated. The advantage of the coupler 103 and data communications system 200 of the present invention will be recognized by those with skill in the art since no contacts are employed, and no oxidation and dirt buildup will then cause signal degradation. Additionally, in the first, second, third, and fourth embodiments, redundant transceivers 215, 245 may also be positioned and arranged so that dirt build up and other corrosive factors will not break down the data communication between the tractor 50 and the trailer 300.

A data communications system 200 provided in accordance with the present invention is also immune to the effects of extreme vibration, since an efficient magnetic transceiver 215''', 245''' or infrared transceiver 215, 245 is maintained as long as the coupler portions 110, 160 are properly mated. Also, for example, the coupler portions 110, 160 even may be separated, i.e., in excess of one-half inch, before communications are interrupted. Furthermore, the communications channel and couplers 103 of the present invention are inherently differential, and so the isolation afforded by the inductive transceiver 215''', 245''' provides a high degree of immunity to common mode noise and voltage drops in ground circuitry. The voltage induced in a coil depends almost entirely upon the voltage difference impressed across the other coil without regard to any ground reference.

The coupler 103''' described in the fifth embodiment is essentially a radio frequency ("RF") datalink with data signals carried by the twisted pair cable 205, 206. This coupler 103''' avoids the problems associated with wireless RF datalinks, namely differentiating between valid network nodes and those of another network in close proximity, and lower data throughput rates resulting from bandwidth limitations of the carrier frequency. In this fashion, the coupler 103''' provided in accordance with the present invention maintains strictly point-to-point communications at all times. Furthermore, since the coils are embedded in the coupler outer ends or outer shells, they are not exposed to corrosive elements which may be present.

Referring now to FIGS. 20–23 other aspects of the data communications system 200 are more fully described, particularly in relation to the controllers 210, 240. In particular as shown in the schematic diagrams of FIGS. 20 and 22–23, a first controller 210 carried by the tractor 50 is illustrated, it being understood the second controller 240 (FIG. 21) carried by the trailer 300 is similar. The first controller 210 in the illustrated embodiment preferably includes a microprocessor 211 or microcomputer operating under stored program control, as understood by those skilled in the art, to perform various functions related to the monitoring and control of various electronic subsystems 220, 250 on either or both of the tractor 50 and trailer 300. The first controller 210 also may include modulator/demodulator means, such as a conventional modem 214 for implementing the modulation scheme described in detail above and preferably for establishing a bidirectional communication link with the corresponding controller 240 such as via a pair of inductively coupled coils of the coupler 103'''.

In addition, a multiplexer is preferably implemented by the microprocessor 211 for multiplexing a plurality of input signals as would be readily understood by those skilled in the art. A demultiplexer is also preferably implemented by the microprocessor 211. In addition, a serial data bus interface 212 is also preferably provided for communicating with a plurality of data transceivers 215a, 215b preferably carried by the first coupler portion 110 of the tractor 50 as described, for example, positioned in the body 111 of the first coupler portion 110 of the SAE J318 coupler 103. A UART (Universal Asynchronous Receiver/Transmitter) 211a, 211b may also be provided for cooperating with the MODEM 214 and serial data bus interface 212 to facilitate data communications as would be readily understood by those skilled in the art.

The first controller 210 also further includes digital interface means 216 for interfacing with digital input signals relating to operation of the tractor 50 or trailer 300, or to generate digital output signals for operation of the tractor 50 or trailer 300. In addition, the controller 210 also preferably includes analog interface 217 means for interfacing with an analog input signal relating to operation of the tractor 50 or the trailer 300, or for generating an analog output signal for operation of the tractor 50 or the trailer 300.

To facilitate diagnostics and other functions of the controller 210, and hence the trailer 300 or the tractor 50, the controller 210 also includes a memory circuit 213 for storing data related to operation of the tractor 50 or trailer 300. A display 225 (FIG. 20) is also preferably connected to at least the controller 210 carried by the tractor 50 to record and display to the driver information relating to operation of the vehicle. A switched power key switch 211, a warning module 228, a switch box 224 for lamps 221a, 221b, 221c are also connected to the controller 210 via various cable or wiring 222, 223, 226, 229 such as illustrated. A diagnostic coupler 416 may also be positioned on the tractor 50 and connected to the controller 210 to permit connection to the external controller 400 such as through an external cable 415.

As illustrated in FIGS. 24–25, the external controller 400 of another embodiment of a data communications system 200' preferably includes a processor or computer 410 for storing data to and retrieving data from the tractor controller 210. The external controller 400 preferably includes a controller display 405 and may also troubleshoot the data communications system 200 as would be readily appreciated by those skilled in the art. Thus, a technician or mechanic would have the option of running diagnostic tests on the entire tractor/trailer combination 50, 300 (when enabled by the present invention) via the diagnostic connector 416. Diagnostic tests of the tractor 50 alone could be performed using either the diagnostic connector 416 or by various subsystems 250 connecting the external controller 400 through the coupler 103 to the tractor 50 of the trailer 300 or multiple trailers also can be diagnosed through a similar external controller using a data link 290', 295' which includes a multiplexer/demultiplexer 295' and various cables 291'–294' through communication channels A–D as illustrated (see FIG. 24).

To further illustrate by example those electronic subsystems 220, 250 which may be readily incorporated into the present invention, TABLE I below gives a partial listing of such subsystems and features which may be controlled and/or monitored by the controllers 210, 240.

TABLE I

| TRACTOR | TRAILER |
| --- | --- |
| Mirror Tracking | Reefer Temperatures |
| Mirror with Trailer Displays | Reefer Pressures |
| Controls for Reefer (Engine) | Trailer Identification |
| Controls for Trailer Slide Axle | Blind Spot Warning |
| Controls for Landing Gear | Cargo Information |
| Active Faring | Smoke/Fire Detection |
| Recorder for Trailer Functions | Overfill (Tanker) |
| Satellite for Trailer Functions | Cargo Shift |
| Brake System Information | Weight Detection |
| Brake By Wire | Anti-Lock Failure |
| Climate Controls for Reefer | Brake By Wire |
| Mirror with Trailer Display | Backup Lamps |
| Trailer Identification | Suspension Control |
| Trailer Brake Temperatures | Sliding Axle Control |
| Trailer Axle Temperatures | Liftable Tailgate |
| Trailer Security | Tire Pressure Monitor |
| Weight Broadcast | Lamp Outage Monitor |
| Trailer Voltage Status | Stop Lamp Saver (with Doubles and Triples) |
| | Water in Air Reservoir |
| | Liftable Landing Gear |
| | Brake Temperature |
| | Emergency Line Pressure Detection |
| | Roll Over Protection |
| | Active Conspicuity (Lighting) |
| | Active Tire Pressure |
| | Backup Alarm |
| | Inventory Data Collection |
| | Security Warning |
| | Trailer Engine Start |
| | Trailer Engine Monitor |
| | Tractor/Charging from Reefer |
| | Trailer Dome Lamps |
| | Rear Door Lift (Motorized) |

Figure 21:
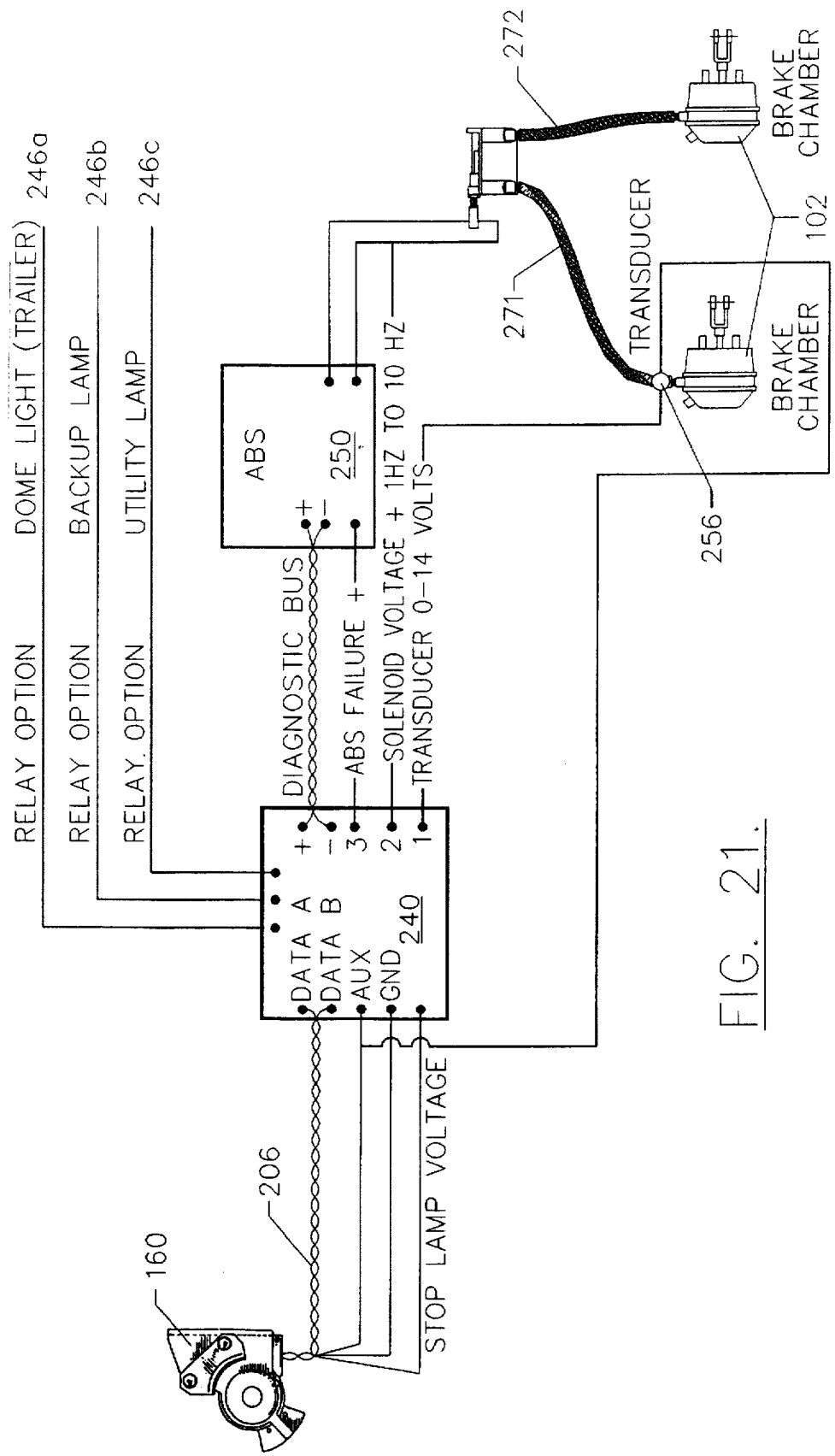
FIG. 21 illustrates a schematic diagram of a controller connected to an ABS module positioned on a trailer according to the present invention.

FIG. 21 illustrates an example of the functions of the controller 240 for the trailer 300. In particular, the controller 240 outputs a number of digital output controls in the form of relay contact closures 246a, 246b, 246c or other associated detectors responsive to various monitored operating conditions of the trailer 300 and/or the tractor 50. In addition, the controller 240 is shown connected to an ABS module or controller 250 in FIG. 21 which, in turn, actuates control valves 256 positioned on the trailer 300 to control the brake chambers of the brakes 102 through brake lines 271, 272 connected thereto. The controller also accepts analog and digital input signal relating to the ABS subsystem.

Figure 22:
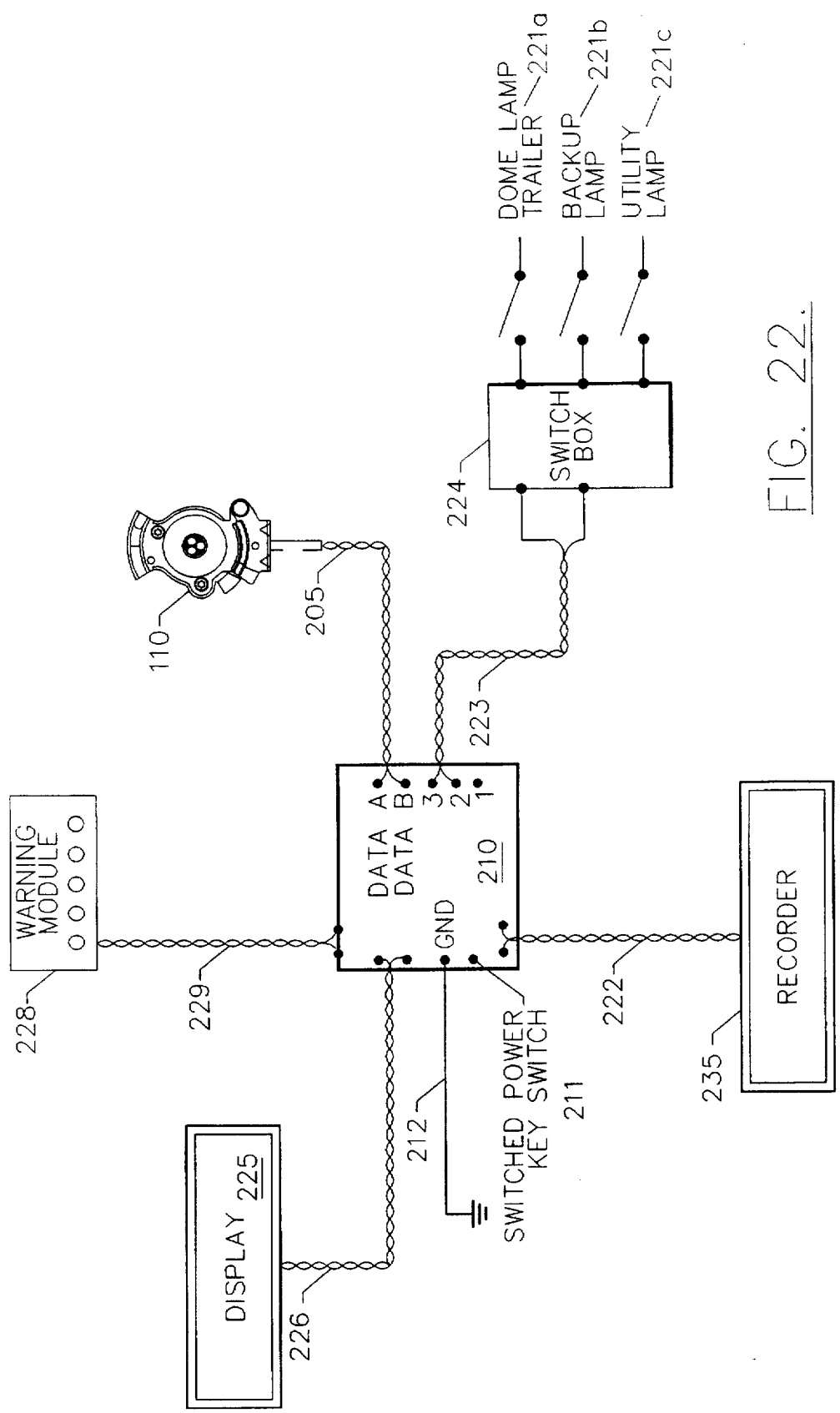
FIG. 22 illustrates another schematic diagram of a controller connected to various subsystems of a tractor according to the invention.
Figure 23:
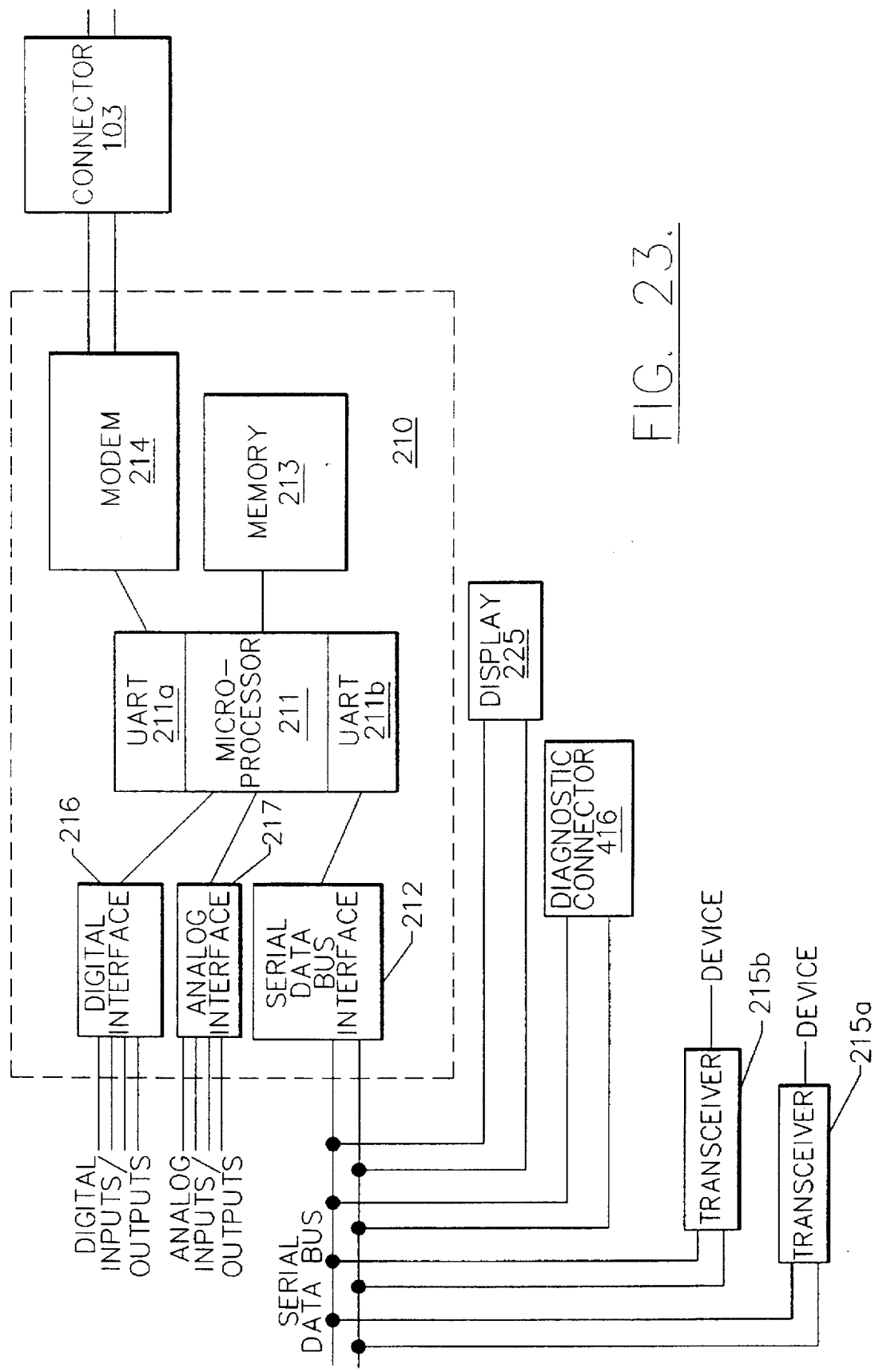
FIG. 23 illustrates a detailed schematic diagram of a controller according to the invention.

To further explain the operation of the first controller 210, FIGS. 22 and 23 schematically illustrate the first controller 210 carried by a tractor 50 and a plurality of transceivers 215a, 215b connected thereto. The transceivers 215a, 215b collect information from various subsystems and communicate the data to the controller 210. The controller 210 then outputs display signals to the tractor 50 display unit 225. FIG. 22 further illustrates the controller 210 of the present invention connected to various subsystems in the tractor 50. In particular, the controller 210 also is connected to a recorder 235, which may be a "black box" type recorder, i.e., audio and/or video, which is well known to those with skill in the art.

Figure 26:
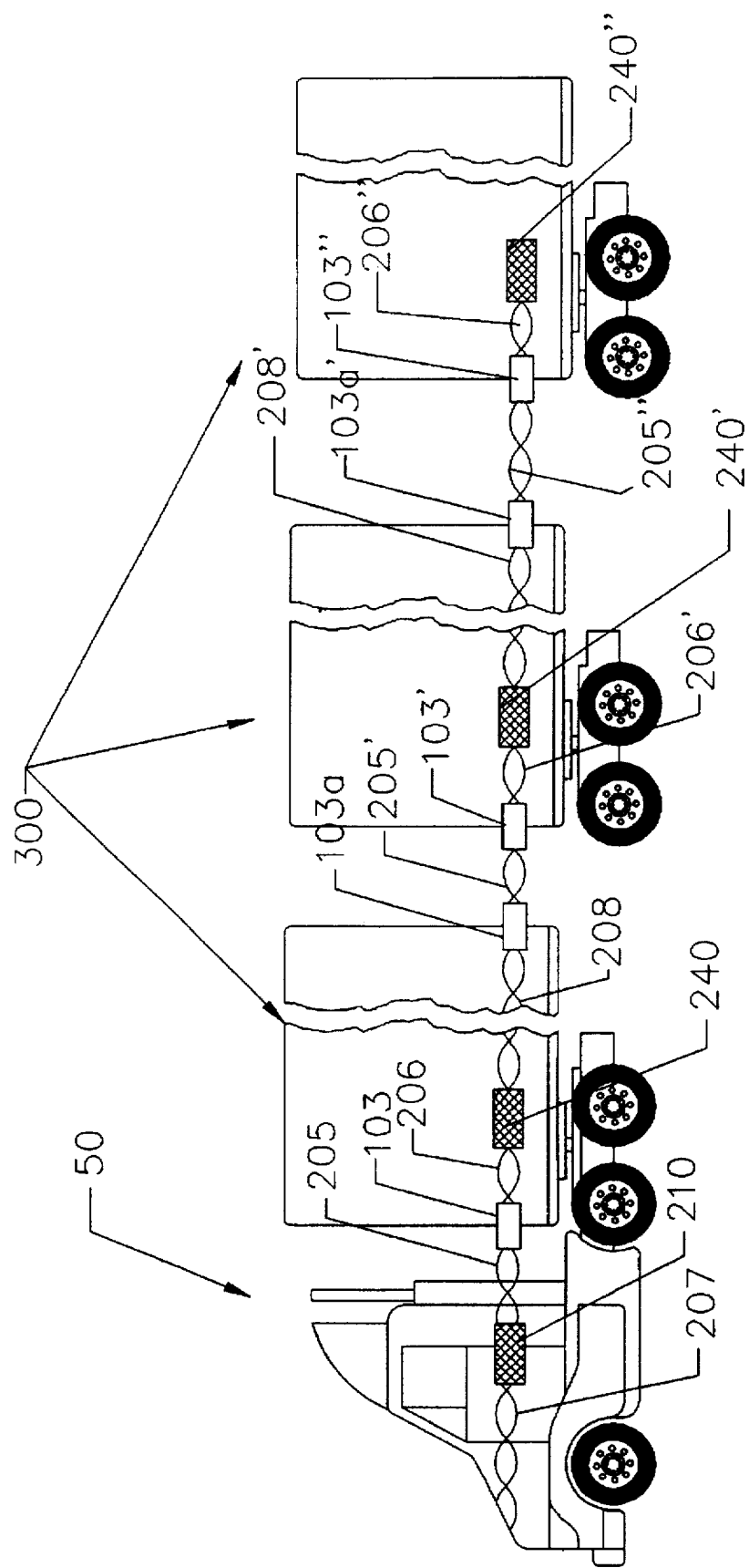
FIG. 26 illustrates a schematic diagram of a tractor/multi-trailer combination according to the present invention.

It should also be noted that either the infrared or the inductive transceiver efficiency of transceivers 215, 245 of the coupler 103 in accordance with the present invention is sufficient to support back-to-back connections of two or more couplers 103, 103', 103" without requiring signal regeneration or amplification. As shown in FIGS. 26–27, a data communications system 200 is illustrated which includes back-to-back communications channels employing two or more couplers 103, 103', 103" in accordance with the present invention.

As illustrated in FIGS. 1–27, the present invention also has various methods associated therewith including a method of monitoring various operating conditions of at least a trailer 300 of a combination of a tractor 50 and a trailer 300. The tractor 50 and trailer 300 combination preferably has a pneumatic braking system 100 carried by the tractor 50 and trailer 300 to permit a driver to supply pneumatic braking pressure from the tractor 50 to the trailer 300. The pneumatic braking system 100 includes a pair of air hoses 105, 107 respectively connected to the tractor 50 and the trailer 300 and a coupler 103 connected to the pair of air hoses 105, 107. The coupler 103 preferably has interconnecting first and second coupler portions 110, 160. The method preferably includes positioning a data communications system 200 so as to be carried by the tractor 50 and the trailer 300. The data communications system 200 includes at least one respective pair of transceivers 215, 245 connected to the first and second coupler portions 110, 160. The method also includes interconnecting the first and second coupler portions 110, 160 and transmitting a signal representative of monitoring data from the trailer 300 to the tractor 50 by the transceiver 245 carried by the second coupler portion 160 so as to be displayed to a driver positioned on the tractor 50.

The present invention also includes a method of equipping a tractor 50 and a trailer 300 with a data communications system 200 for monitoring various operating conditions of at least the trailer 300 by a driver positioned within the cab 55 of the tractor 50. The method preferably includes providing the tractor 50 and the trailer 300 with a pneumatic braking system 100 to supply braking pressure from the tractor 50 to the trailer 300 by the driver. The pneumatic braking system 100 includes at least one pair of air hoses 105, 107 respectively connected to the tractor 50 and the trailer 300 and a coupler 103 connected to the pair of air hoses 105, 107 with the coupler 103 having interconnecting first and second coupler portions 110, 160 arranged to facilitate connecting and disconnecting the pair of air hoses 105, 107. The method also preferably includes providing a data communications system 200 including at least one pair of transceivers 215, 245 connected to the first and second coupler portions 110, 160 for communicating signals representative of monitoring data between the tractor 50 and the trailer 300 so as to in turn be monitored by a driver positioned in the cab 55 of the tractor 50. The method of equipping further includes positioning the pair of transceivers 215, 245 inside of the first and second coupler portions 110, 160 so as to be protectively shielded and thus subject to less damage.

The present invention further includes a method of monitoring various operating conditions of at least a trailer 300 of a combination of a tractor 50 and a trailer 300. The tractor and trailer combination preferably have a pneumatic braking system 100 carried by the tractor 50 and trailer 300 to permit a driver to supply pneumatic braking pressure from the tractor 50 to the trailer 300. The pneumatic braking system 100 includes a pair of air hoses 105, 107 respectively connected to the tractor 50 and the trailer 300 and a coupler 103 connected to the pair of air hoses 105, 107. The coupler 103 preferably has interconnecting first and second coupler portions 110, 160. A data communications system 200 which preferably includes a respective pair of transceivers 215, 245 is connected to the first and second coupler portions 110, 160. The method preferably includes detecting a variance in an operating condition on the trailer 300, transmitting a data signal representative of the variance from the trailer 300 to the tractor 50 by the transceiver 245 carried by the second coupler portion 160, and receiving a data signal representative of the variance from the trailer 300 to the tractor 50 by the transceiver 215 carried by the first coupler portion 110 so as to be displayed to a driver positioned on the tractor 50.

In the drawings and specification, there have been disclosed typical preferred embodiments of the invention and, although specific terms are employed, these terms are used in a descriptive sense only and not for purposes of limitation. The invention has been described in considerable detail with specific reference to various illustrated embodiments. It will be apparent, however, that various modifications and changes can be made within the spirit and scope of the invention as described in the foregoing specification and defined in the appended claims.

That which is claimed:

1. In combination with a tractor and a trailer, an apparatus for monitoring various operating conditions of at least the trailer by a driver positioned on the tractor, the apparatus comprising:

a pneumatic braking system carried by the tractor and the trailer to permit a driver to supply pneumatic braking pressure from the tractor to the trailer, said pneumatic braking system including at least one pair of air hoses connected to the tractor and the trailer, and a coupler connected to each of said air hoses, said coupler having interconnecting first and second coupler portions arranged to facilitate connecting and disconnecting said respective air hoses, said first and second coupler portions connecting to define a nonconductive interface therebetween; and a data communications system including a respective pair of transceivers connected to said first and second coupler portions and arranged for transmitting and receiving signals representative of monitoring data from the trailer to the tractor over said nonconductive interface so as to in turn be monitored by a driver positioned on the tractor.

2. In combination with a tractor and a trailer, an apparatus as defined by claim 1, further comprising a power supply system having portions thereof connected to said first and second coupler portions and arranged for supplying power from the tractor to the trailer.

3. In combination with a tractor and a trailer, an apparatus as defined by claim 1, wherein said data communications system further includes first and second data communication cables respectively carried by said air hoses of said pneumatic braking system, said first data communication cable extending from the tractor to said first coupler portion and being connected to said transceiver carried by said first coupler portion, said second data communications cable being connected to said transceiver carried by said second coupler portion and extending from said second coupler portion to at least one monitored operating condition of the trailer.

4. In combination with a tractor and a trailer, an apparatus as defined by claim 1, wherein said data communications system further includes, means carried by said second coupler portion for determining performance operating conditions of at least one system of the trailer.

5. In combination with a tractor and a trailer, an apparatus as defined by claim 1, wherein said data communications system further includes at least one controller arranged for controlling data communication between the tractor and the trailer, said at least one controller being connected to the tractor and in communication with said transceiver carried by said first coupler portion, a modulator arranged in communication with said at least one controller for modulating data communicated between the tractor and the trailer, and a demodulator arranged in communication with said transceiver carried by said second coupler portion for demodulating modulated data communicated between the tractor and the trailer.

6. In combination with a tractor and a trailer, an apparatus as defined by claim 5, wherein said at least one controller of said data communications system includes a data bus interface arranged for communicating with at least one data transceiver, a processor arranged for processing data, and a memory arranged for storing and retrieving data related to operation of at least the trailer.

7. In combination with a tractor and a trailer, an apparatus as defined by claim 1, wherein said transceivers of said data communications system comprise first and second inductive transceivers arranged on said first and second coupler portions, respectively, for providing data communications over said nonconductive interface between said first and second coupler portions.

8. In combination with a tractor and a trailer, an apparatus as defined by claim 7, wherein said first and second coupler portions rotatably engage about a coupling axis, and wherein said first and second inductive transceivers comprise first and second inductive coils arranged on said first and second coupler portions, respectively, said first and second coils being coaxially arranged about said coupling axis when said first and second coupler portions are connected.

9. In combination with a tractor and a trailer, an apparatus as defined by claim 1, wherein said first and second coupler portions of said pneumatic braking system respectively comprise interconnecting first and second gladhand coupler portions, each of said first and second gladhand coupler portions having a hollow body arranged to be positioned in fluid communication with a fluid, wherein said first and second gladhand coupler portions join to enclose a space within said coupler, and wherein said first and second transceivers are respectively positioned within said hollow body of said first and second gladhand coupler portions such that said first and second transceivers transmit and receive signals within said space enclosed within said coupler.

10. In combination with a tractor and a trailer, an apparatus as defined by claim 9, wherein said transceivers of said data communications system comprise respective first and second optical transceivers arranged on said first and second coupler portions, respectively, for providing optical data communication between said first and second gladhand coupler portions within said space enclosed within said coupler to provide relative immunity from electromagnetic forces surrounding said coupler.

11. In combination with a tractor and a trailer, an apparatus as defined by claim 10, wherein each of said first and second coupler portions have a cavity therein, said first and second coupler portions joining to define an opening between said cavities of said first and second coupler portions, and wherein said first and second optical transceivers communicate through said opening between said cavities of said first and second coupler portions.

12. In combination with a cab-type tractor and a trailer, an apparatus for monitoring various operating conditions of the tractor and the trailer by a driver positioned in the cab of the tractor, the apparatus comprising:

a pneumatic braking system carried by the tractor and the trailer to permit a driver to supply pneumatic braking pressure from the tractor to the trailer, said pneumatic braking system including at least one pair of air hoses respectively connected to the tractor and the trailer, and a coupler connected to said pair of air hoses, said coupler having interconnecting first and second coupler portions arranged to facilitate connecting and disconnecting said pair of air hoses, said first and second coupler portions connecting to define a nonconductive interface therebetween; and a data communications system including at least one respective pair of transceivers connected to said first and second coupler portions for transmitting and receiving signals representative of monitoring data of the tractor and the trailer over said nonconductive interface so as to in turn be monitored by a driver positioned in the cab of the tractor.

13. In combination with a tractor and a trailer, an apparatus as defined by claim 12, wherein said data communications system further includes a plurality of light emitters connected to said first coupler portion and arranged for emitting light outwardly from said first coupler portion.

14. In combination with a tractor and a trailer, an apparatus as defined by claim 12, wherein said data communications system further includes at least one controller arranged for controlling data communications between the tractor and the trailer, said at least one controller being connected to the tractor and in communication with said transceiver carried by said first coupler portion, a modulator arranged in communication with said at least one controller for modulating data communicated between the tractor and the trailer, and a demodulator arranged in communication with said transceiver carried by said second coupler portion for demodulating modulated data communicated between the tractor and the trailer.

15. In combination with a tractor and a trailer, an apparatus as defined by claim 14, wherein said at least one controller of said data communications system includes a data bus interface arranged for communicating with at least one data transceiver, a processor arranged for processing data, and a memory arranged for storing and retrieving data related to operation of at least the trailer.

16. In combination with a tractor and a trailer, an apparatus as defined by claim 12, wherein said transceivers of said data communications system comprise first and second inductive transceivers arranged on said first and second coupler portions, respectively, for inductively transmitting and receiving data communications over said nonconductive interface between said first and second coupler portions.

17. In combination with a tractor and a trailer, an apparatus as defined by claim 16, wherein said first and second coupler portions rotatably engage about a coupling axis, and wherein said transceivers of said data communications system comprise first and second inductive coils arranged on said first and second coupler portions, respectively, said first and second coupler coils being coaxially arranged about said coupling axis when said first and second coupler portions are connected.

18. In combination with a tractor and a trailer, an apparatus as defined by claim 12, wherein said first and second coupler portions of said pneumatic braking system respectively comprise interconnecting first and second gladhand coupler portions, each of said first and second gladhand coupler portions having a hollow body arranged to be positioned in fluid communication with a fluid, wherein said first and second gladhand coupler portions join to enclose a space within said coupler, wherein said first and second transceivers are respectively positioned within said hollow body of said first and second gladhand coupler portions such that said first and second transceivers transmit and receive signals within said space enclosed within said coupler.

19. In combination with a tractor and a trailer, an apparatus as defined by claim 18, wherein said transceivers of said data communications system comprise respective first and second optical infrared transceivers arranged on said first and second coupler portions, respectively, for providing optical infrared data communications between said first and second gladhand coupler portions within said spaced enclosed within said coupler to provide relative immunity from electromagnetic forces surrounding said coupler.

20. In combination with a tractor and a trailer, an apparatus as defined in claim 19, further comprising a power supply system including a power supply connection and a ground connection connected to said first and second coupler portions and arranged for supplying power from the tractor to the trailer.

21. In combination with a tractor and a trailer, an apparatus as defined by claim 19, wherein said data communications system further includes first and second data communications cables respectively carried by said air hoses of said pneumatic braking system, said first cable extending from the tractor to said first coupler portion and being connected to said transceiver carried by said first coupler portion, said second cable being connected to said transceiver carried by said second coupler portion and extending from said second coupler portion to at least one monitored operating condition of the trailer.

22. In combination with a tractor and a trailer, an apparatus as defined by claim 19, wherein said data communications system further includes, means carried by said first second coupler portion for determining performance operating conditions of at least one system of the trailer.

23. In combination with a tractor and a trailer, an apparatus as defined by claim 19, wherein each of said first and second coupler portions have a cavity therein, said first and second coupler portions joining to define an opening between said cavities of said first and second coupler portions, and wherein said first and second optical transceivers communicate through said opening between said cavities of said first and second coupler portions.

24. A data communications system arranged to be carried by a tractor and a trailer for monitoring various operating conditions of at least the trailer by a driver positioned on the tractor, the data communications system comprising:

first and second controllers respectively carried by a tractor and a trailer for controlling data communications therebetween;

interconnecting first and second coupler portions respectively connected to a tractor and a trailer, said first and second coupler portions connecting to define a nonconductive interface therebetween, said first and second coupler portions being arranged during interconnection thereof so as to permit a driver to supply pneumatic braking pressure from a tractor to a trailer; and first and second transceivers respectively positioned in communication with said first and second controllers and respectively carried by said first and second pneumatic coupler portions for transmitting and receiving signals representative of monitoring data from the trailer to the tractor over said nonconductive interface so as to in turn be monitored by a driver positioned on the tractor.

25. A data communications system as defined by claim 24, wherein said first and second transceivers comprise respective first and second optical transceivers arranged for providing optical data communications between said first and second coupler portions to provide relative immunity from electromagnetic forces surrounding said coupler.

26. A data communications system as defined by claim 24, wherein said first and second transceivers comprise first and second inductive transceivers for inductively transmitting and receiving signal representative of monitored data from the trailer to the tractor.

27. A data communications system as defined by claim 24, further comprising a pair of modulators respectively arranged in communication with said first and second controllers and said first and second transceivers for modulating data communicated between the tractor and the trailer, and a pair of demodulators respectively arranged in communication with said first and transceiver and said first and second controllers for demodulating modulated data communicated between the tractor and the trailer.

28. A data communications system as defined by claim 27, wherein said first and second controllers each comprise a data bus interface arranged for communicating with at least one of said first and second transceivers, a processor connected to said data bus interface and arranged for processing data, and a memory connected to said processor arranged for storing and retrieving data related to operation of at least the trailer.

29. A data communications system as defined by claim 28, further comprising first and second data communications cables respectively connected to said first and second coupler portions, said first cable extending from the tractor to said first coupler portion and being connected to said transceiver connected to said first coupler portion, said second cable being connected to said transceiver carried by said second coupler portion and extending from said second coupler portion to at least one monitored operating condition of the trailer.

30. A data communications system as defined by claim 29, further comprising means carried by said second coupler portion for determining performance operating conditions of the trailer when disconnected from the tractor.

31. A data communications system as defined by claim 30, further comprising a plurality of light emitters connected to said first coupler portion and arranged for emitting light outwardly from said first coupler portion.

32. A pneumatic coupler for a pneumatic braking system arranged to be carried by a tractor and a trailer for monitoring various operating conditions of at least the trailer by a driver positioned on a tractor, the pneumatic coupler comprising:

first and second gladhand coupler portions arranged to respectively be connected to a tractor and a trailer to permit a driver to supply pneumatic braking pressure from a tractor to a trailer, each coupler portion having a hollow body arranged to be positioned in fluid communication with a fluid, said first and second gladhand coupler portions joining to enclose a space within said coupler; and first and second transceivers respectively positioned within said hollow body of said first and second coupler portions for transmitting and receiving signals representative of monitoring data from at least the trailer within said space enclosed within said coupler so as to in turn be monitored by a driver positioned on the tractor.

33. A pneumatic coupler as defined by claim 32, wherein said first and second transceivers comprise first and second inductive transceivers on said first and second coupler portions, respectively, for inductively transmitting and receiving signal representative of monitored data from the trailer to the tractor, within said space enclosed within said coupler.

34. A pneumatic coupler as defined by claim 33, wherein said first and second coupler portions rotatably engage about a coupling axis, and wherein said first and second inductive transceivers comprise first and second inductive coils on said first and second coupler portions, respectively, said first and second coils being coaxially arranged about said coupling axis when said first and second coupler portions are connected.

35. A pneumatic coupler as defined by claim 32, wherein said first and second coupler portions of respectively comprise interconnecting first and second gladhand coupler portions.

36. A pneumatic coupler as defined by claim 35, wherein said first and second transceivers comprise respective first and second optical transceivers arranged on said first and second coupler portions, respectively, for providing optical data communications between said first and second gladhand coupler portions within said space enclosed within said coupler to provide relative immunity from electromagnetic forces surrounding said coupler.

37. A pneumatic coupler as defined by claim 36, further comprising a plurality of light emitters connected to said first coupler portion and arranged for emitting light outwardly from said first coupler portion.

38. A pneumatic coupler as defined by claim 36, wherein each of said first and second coupler portions have a cavity therein, said first and second coupler portions joining to define an opening between said cavities of said first and second coupler portions, and wherein said first and second optical transceivers communicate through said opening between said cavities of said first and second coupler portions.

39. A method of monitoring various operating conditions of at least a trailer of a combination of a tractor and a trailer, the tractor and trailer combination having a pneumatic braking system carried by the tractor and trailer to permit a driver to supply pneumatic braking pressure from the tractor to the trailer, the pneumatic braking system including a pair of air hoses respectively connected to the tractor and the trailer, and a coupler connected to the pair of air hoses, the coupler having interconnecting first and second coupler portions, the first and second coupler portions connecting to define a nonconductive interface therebetween, the method comprising:

positioning a data communications system so as to be carried by the tractor and the trailer, the data communications system including a respective pair of transceivers connected to the first and second coupler portions;

interconnecting first and second coupler portions; and transmitting a signal representative of monitoring data from the trailer to the tractor over the nonconductive interface by the transceiver carried by the second coupler portion so as to be displayed to a driver positioned on the tractor.

40. A method of equipping a tractor and a trailer with a data communications system for monitoring various operating conditions of at least the trailer by a driver positioned within the cab of the tractor, the method comprising:

providing the tractor and the trailer with a pneumatic braking system to supply braking pressure from the tractor to the trailer by the driver, the pneumatic braking system including at least one pair of air hoses respectively connected to the tractor and the trailer and a coupler connected to the pair of air hoses with the coupler having interconnecting first and second coupler portions arranged to facilitate connecting and disconnecting the pair of air hoses, the first and second coupler portions connecting to define a nonconductive interface therebetween; and providing a data communications system including a pair of transceivers connected to the first and second coupler portions for communicating signals representative of monitoring data between the tractor and the trailer over the nonconductive interface so as to in turn be monitored by a driver positioned in the cab of the tractor.

41. A method as defined by claim 40, including positioning the pair of transceivers inside of the first and second coupler portions so as to be protectively shielded and thus subject to less damage.

42. A method of monitoring various operating conditions of at least a trailer of a combination of a tractor and a trailer, the tractor and trailer combination having a pneumatic braking system carried by the tractor and trailer to permit a driver to supply pneumatic braking pressure from the tractor to the trailer, the pneumatic braking system including a pair of air hoses respectively connected to the tractor and the trailer, and a coupler connected to the pair of air hoses, the coupler having interconnecting first and second coupler portions, the first and second coupler portions connecting to define a nonconductive interface therebetween, and a data communications system including a respective pair of transceivers connected to the first and second coupler portions, the method comprising:

detecting a variance in an operating condition on the trailer;

transmitting a data signal representative of the variance from the trailer to the tractor over the nonconductive interface by the transceiver carried by the second coupler portion; and receiving a data signal representative of the variance from the trailer to the tractor over the nonconductive interface by the transceiver carried by the first coupler portion so as to be displayed to a driver positioned on the tractor.

* * * * *